United States Patent
Ninomiya et al.

[19]

[11] Patent Number: 5,989,034

[45] Date of Patent: Nov. 23, 1999

[54] INFORMATION ORGANIZATION METHOD, INFORMATION ORGANIZATION SHEET, AND DISPLAY APPARATUS

[76] Inventors: Toshiharu Ninomiya, 19-4 Gotenyama 2-chome, Tokyo; Tomihisa Naito, 735-39, Odake, Kanagawa-ken, both of Japan

[21] Appl. No.: 08/913,394

[22] PCT Filed: Sep. 18, 1996

[86] PCT No.: PCT/JP96/02674

§ 371 Date: Sep. 9, 1997

§ 102(e) Date: Sep. 9, 1997

[87] PCT Pub. No.: WO98/12622

PCT Pub. Date: Mar. 26, 1998

[51] Int. Cl.[6] .......................... G09B 19/18; G09B 29/00; B42D 15/00

[52] U.S. Cl. .......................... 434/107; 434/430; 283/67; 283/115; 705/1

[58] Field of Search .................................. 434/107, 109, 434/118, 154, 238, 277, 278, 282, 365, 428, 430; 283/44, 67, 81, 115, 117; 705/1, 7, 8, 9, 10, 35, 36, 500

[56] References Cited

U.S. PATENT DOCUMENTS 4,650,422  3/1987  Gorczynski ............................ 434/154
5,011,186  4/1991  Bodziak et al. ........................ 281/12
5,183,297  2/1993  Bodzaik et al. ....................... 283/67
5,595,402  1/1997  Omori .................................... 283/67
5,662,478  9/1997  Smith, Jr. ............................. 434/237
5,688,125  11/1997  Birdsong-Raffo ..................... 434/72

*Primary Examiner*—Robert A. Hafer
*Attorney, Agent, or Firm*—Burns, Doane, Swecker & Mathis, LLP

[57] ABSTRACT

In a hexagonal element extraction method, a hexagonal theme region (0) for writing or inputting a subject or the theme to be given a thought is set, and hexagonal first-layer element regions (1–6) for writing or inputting elements such as subjects, action means, and the like that come into one's mind in association with the theme written in the theme region (0) are set around the theme region (0) to form a first layer. Furthermore, elements that come into one's mind in associated with those written in the first-layer element regions (1–6) are defined as new subtheme, and hexagonal subtheme regions (3-0, 5-0) for writing or inputting these subthemes are set. Hexagonal second-layer element regions (3-1, 3-2, . . . , 3-6, 5-1, 5-2, . . . , 5-6) for writing or inputting elements such as subjects, action means, and the like that come into one's mind in association with the subthemes written in the subtheme regions (3-0, 5-0) are set around the subtheme regions to form a second layer. The number of layers is increased in such procedure to hierarchically break down the elements that occur such as subjects, action means, and the like, thereby easily transforming abstract elements into concrete elements.

31 Claims, 36 Drawing Sheets

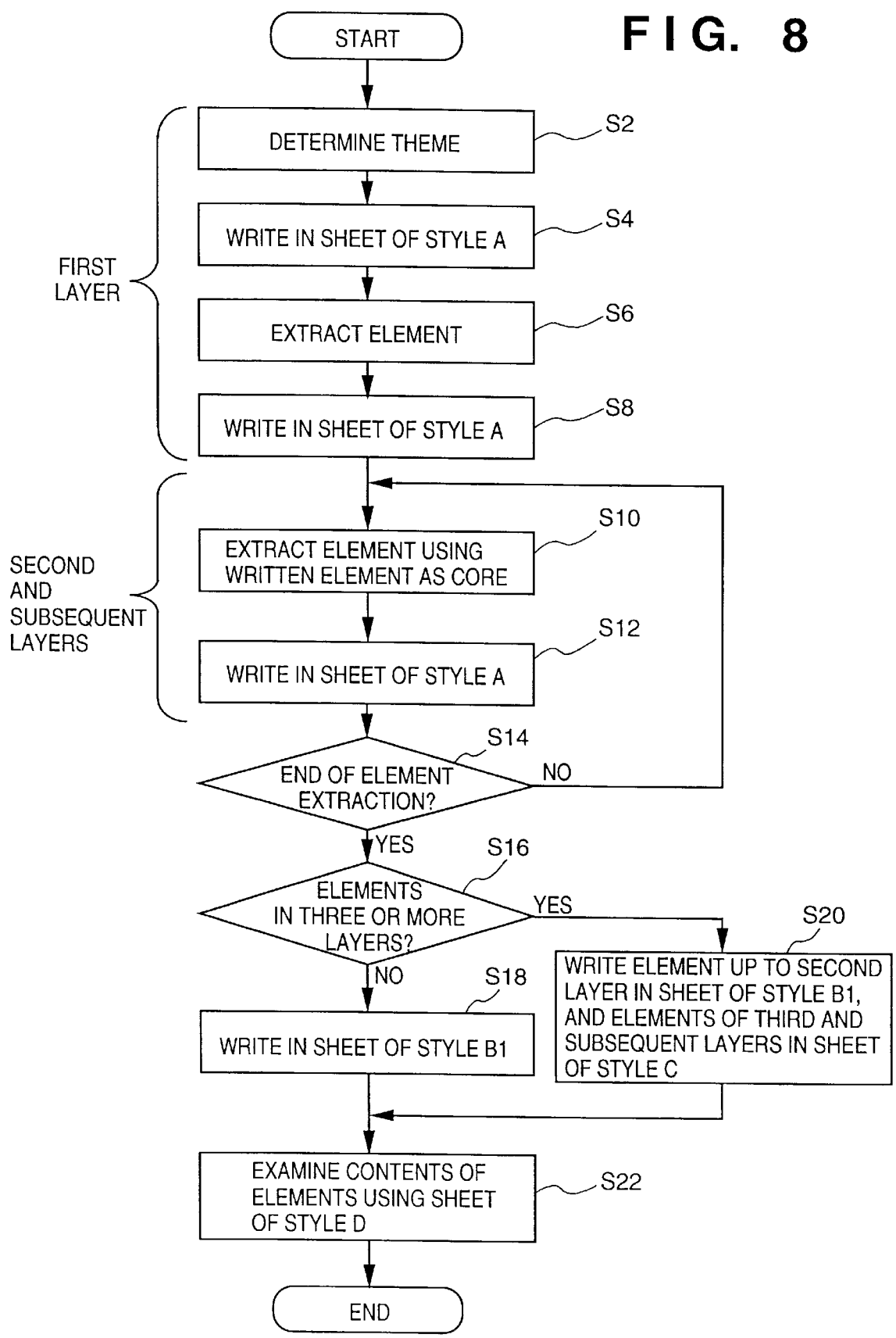

FIG. 9A
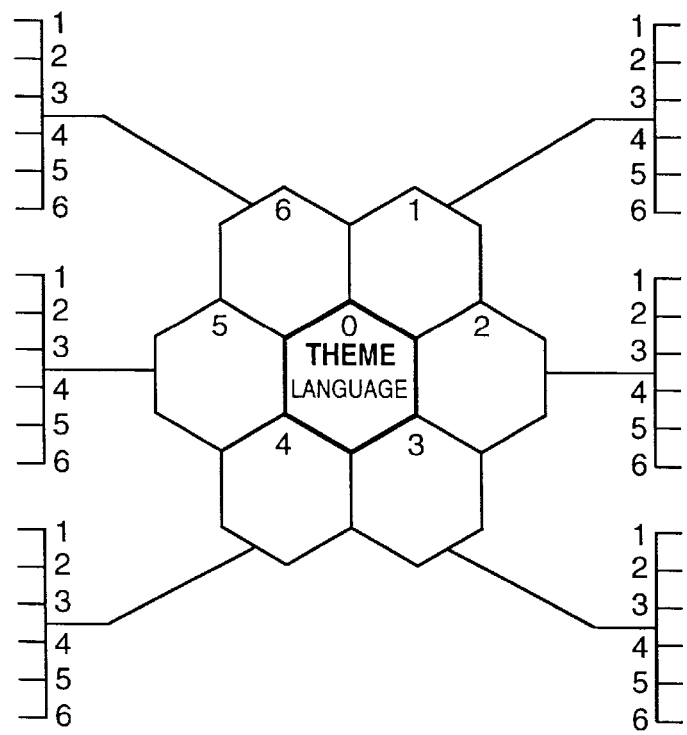
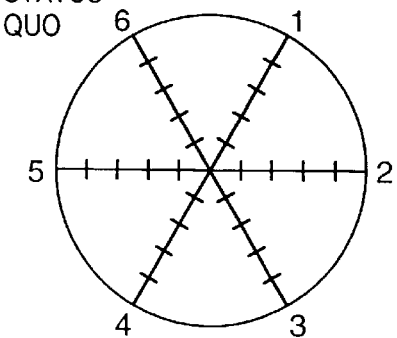

FIG. 9B
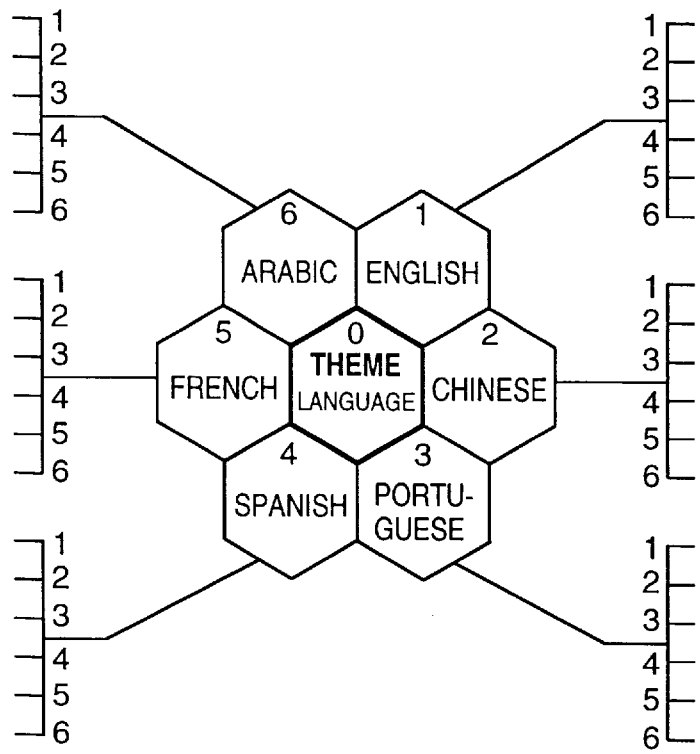
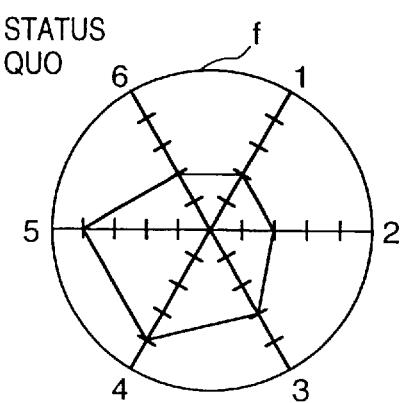

FIG. 9C
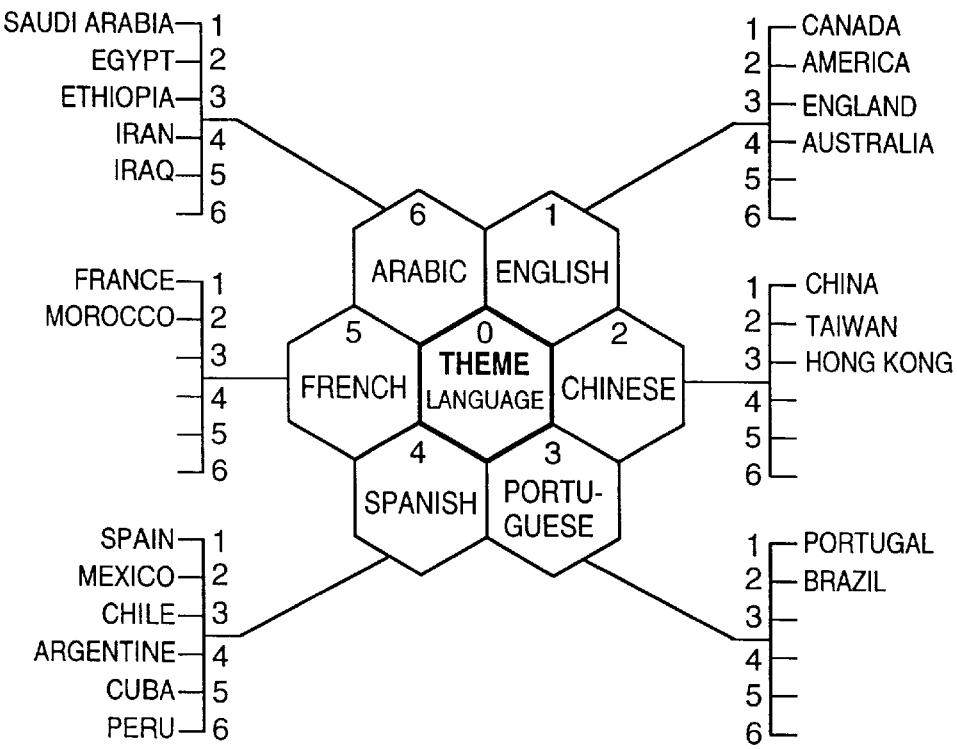
ELEMENT EXTRACTION WORK SHEET (STYLE A)   No.
THEME  LANGUAGE
OBJECTIVE
CREATED DATE
AUTHOR
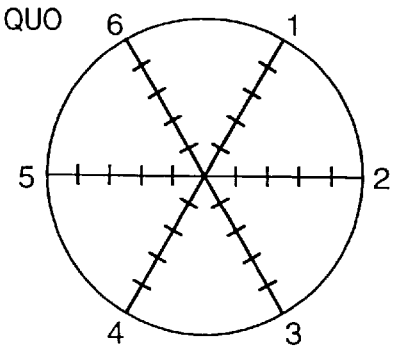
MEMORANDUM

FIG. 33

| | |
|---|---|
| m1 | STEP CODE OF DISPLAYING CELL |
| m2 | STEP CODE OF INPUTTING DATA TO CELL |
| m3 | STEP CODE OF COPYING DATA TO ANOTHER CELL |
| m4 | STEP CODE OF MOVING DATA TO DESIGNATED CELL |
| m5 | STEP CODE OF EXCHANGING DATA BETWEEN DESIGNATED CELLS |

M

INFORMATION ORGANIZATION METHOD, INFORMATION ORGANIZATION SHEET, AND DISPLAY APPARATUS

This application is the U.S. national stage of PCT/JP96/02674 filed Sep. 18, 1996.

FIELD OF THE INVENTION

The present invention relates to an information organization method, an information organization sheet, and a display apparatus, which can clearly and systematically organize various kinds of information as the products of thinking of human beings, and can easily support solving problems and achieving objectives in daily life, and information organization as a learning tool.

BACKGROUND OF THE INVENTION

In recent years, various schemes for improving intellectual productivity associated with the present application have been proposed by various writings, e.g., "Mind Map" by Tony Buzzer, "KJ Method" by Jiro Kawakita, "Super Organization Method" by Yukio Noguchi, "Post-it Intellectual Production Technique" by Akira Nishimura, and the like.

Looking back into the past further, "Bones of Fish, Factorizing Projection", "Part Method", "Critical Path Method", and the like have been proposed.

However, since most of these conventional schemes ultimately assume manual systematization and organization of information, it is, in fact, hard to accelerate works, and such works are very cumbersome for users.

SUMMARY OF THE INVENTION

The present invention has been made to solve the problems in the conventional schemes, and has as its object to provide an information organization method, an information organization sheet, and a display apparatus, which can clearly and systematically organize various kinds of information as the products of thinking of human beings, can easily support solving problems and achieving objectives in daily life, and information organization for converting abstract idea into concrete idea to realize a target objective such as a future dream, and can quickly systemize and organize information.

It is another object of the present invention to provide an information organization method and a display apparatus, which can easily perform editing, movement, addition, and the like of manually systemized and organized events input to a computer by effectively utilizing powerful processing performance of the computer, and can rapidly perform systematization of various ideas.

It is another object of the present invention to provide an information organization method which can be implemented by a computer and can process information and build a database by interfacing with the computer, and a display apparatus used in information organization.

It is still another object of the present invention to provide an information organization method, an information organization sheet, and a display apparatus which can serve as a very effective "hint and tool" that can efficiently, even slightly solve problems that arise in daily life albeit slightly.

Be it a trivial or special matter, one always thinks about it to cope with it. If his or her thoughts or strategies are wrong, his or her knowledge about that matter is insufficient or unbalanced, or if he or she excessively sticks to his or her own idea, ignore priority, or cannot foresee events that are likely to occur, it often results in sorrow or unfortunate end.

Even when one has a sound idea and effective solution, if he or she forgets them when he or she takes action, cannot satisfactorily convey such idea to other people, has insufficient resources required for realization, or cannot find specific techniques required, no good results can be obtained.

It is, therefore, still another object of the present invention to provide an information organization method, an information organization sheet, and a display apparatus, which can provide useful information and tool in practice, and support so that good thinking results in a good action and a good result in daily life.

One apts to think that his or her idea is the only creative idea, and one and only. However, one acquires knowledge from education, advice from those around us, and reading from birth, and such acquired knowledge sublimes into intelligence. Human intelligence recognizes many new facts looking into the relations of new matters, and gains more knowledge. Therefore, reference knowledge and criteria are required to find a new fact and to obtain a creative idea.

It is, therefore, still another object of the present invention to provide an information organization method, an information organization sheet, and a display apparatus, which can promote mutual understanding more effectively than compositions by providing some knowledge and criteria via conversation while expressing everybody's knowledge by a honeycomb-like hexagonal structure.

It is still another object of the present invention to provide an information organization method, an information organization sheet, and a display apparatus which not only provide existing explanatory notes and knowledge based on conversation, as described above, but also allow a user to organically systemize his or her idea.

In order to achieve the above objects, an information organization method according to the present invention has the following characteristic features.

That is, there is provided an information organization method for systematically organizing related information associated with a predetermined theme while sequentially writing the related information into a predetermined region, comprising the step of:

writing the predetermined theme in a hexagonal first region;

writing first-layer related information associated with the predetermined theme in each of a plurality of hexagonal second regions which are set around the first region;

writing the first-layer related information in a hexagonal third region; and writing second-layer related information associated with the first-layer related information in each of a plurality of hexagonal fourth regions, which are set around the third region, thereby organizing the related information associated with the predetermined theme while breaking down the related information into a plurality of layers.

In order to achieve the above objects, an information organization sheet according to the present invention has the following characteristic features.

There is provided an information organization sheet for systematically organizing related information associated with a predetermined theme while sequentially writing the related information into a predetermined region, comprising:

a hexagonal first region for writing the predetermined theme;

a plurality of hexagonal second regions which are set around the first region and are used for writing first-layer related information associated with the predetermined theme;

a hexagonal third region for writing the first-layer related information; and a plurality of hexagonal fourth regions which are set around the third region and are used for writing second-layer related information associated with the first-layer related information, wherein the second regions and subsequent regions are arranged to break down the first region into a plurality of layers.

In order to achieve the above objects, a display apparatus according to the present invention has the following characteristic features.

There is provided a display apparatus for systematically organizing related data while sequentially inputting related data associated with predetermined theme data in a predetermined cell, comprising:

display means for hierarchically breaking down and displaying a hexagonal first cell in which the predetermined theme data can be input, a plurality of hexagonal second cells which are set around the first cell and in which first-layer related data associated with the predetermined theme data can be input, a hexagonal third cell in which the first-layer related data can be input, and a plurality of hexagonal fourth cells which are set around the third cell and in which second-layer related data associated with the first-layer related data can be input; and input means for inputting the predetermined theme data or the related data associated with the predetermined theme data to the first to fourth cells.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a flow chart showing the execution procedure of an information organization method according to the first embodiment of the present invention;

FIG. 9A shows the sheet of style A with the execution result of the information organization method of the first embodiment;

FIG. 9B shows the sheet of style A with the further execution result of the information organization method of the first embodiment;

FIG. 9C shows the sheet of style A with a still further execution result of the information organization method of the first embodiment;

FIG. 33 shows the structural features when the information organization method program of the third embodiment is stored in a recording medium.

DETAILED DESCRIPTION OF THE PREFERRED EMBODIMENTS

The preferred embodiments of the present invention will be described in detail hereinafter with reference to the accompanying drawings.

The basic concept of an information organization method (to be referred to as a hexagonal element extraction method hereinafter) described as an embodiment is to deepen understanding by partially analyzing a subject and connecting elements (portions), and observation of a familiar event (object), recognition of relations of events, and their expression methods can be executed in a form suitable for the individual situations and abilities. Hence, the method of this embodiment can be used independently of areas, ages, occupations, jobs, and status.

Since "the relations of portions can be clarified while reminding of the whole" for matters from productive to playful ones, the method of this embodiment can be effectively applied to every subject.

[Use Method of Hexagonal Element Extraction Method]

The use method of the hexagonal element extraction method is roughly classified into the four following categories:

Helps find the theme itself to be given a thought now and further deepen recognition.

Helps cultivate thinking and achieve well-balanced thinking.

Helps reliably execute decided items.

Helps each person develop the hexagonal element extraction method into an effective one.

Note that "finding the theme itself to be given a thought now and further deepening recognition" is likely to be treated lightly in daily life, but "specifying what to do now (theme)" is an intellectual activity that takes place most frequently and is important in daily life in practice.

"Finding the theme" requires accurate recognition of the status quo, and the accurate recognition of the status quo presupposes knowledge pertaining to potential and actual subjects around ourselves. Recognition of potential subjects requires possession of much knowledge initially so as to obtain an actual image, independently of whether or not one has such knowledge now.

As for actual subjects, one does not always clearly recognize the significance of such subject, and to recognize such subject is to satisfactorily consider the position of the subject in the realm of the whole, priority, relations to other elements, conditions required for coping with it, reactions of people around him or her after action (coping with it), and the like.

To correctly recognize "what to do now" is to correctly answer many questions, and if one can do it, most of problems "do not arise, or are easy to solve if they indeed arise".

[Principle of Hexagonal Element Extraction Method]

Figure 1:
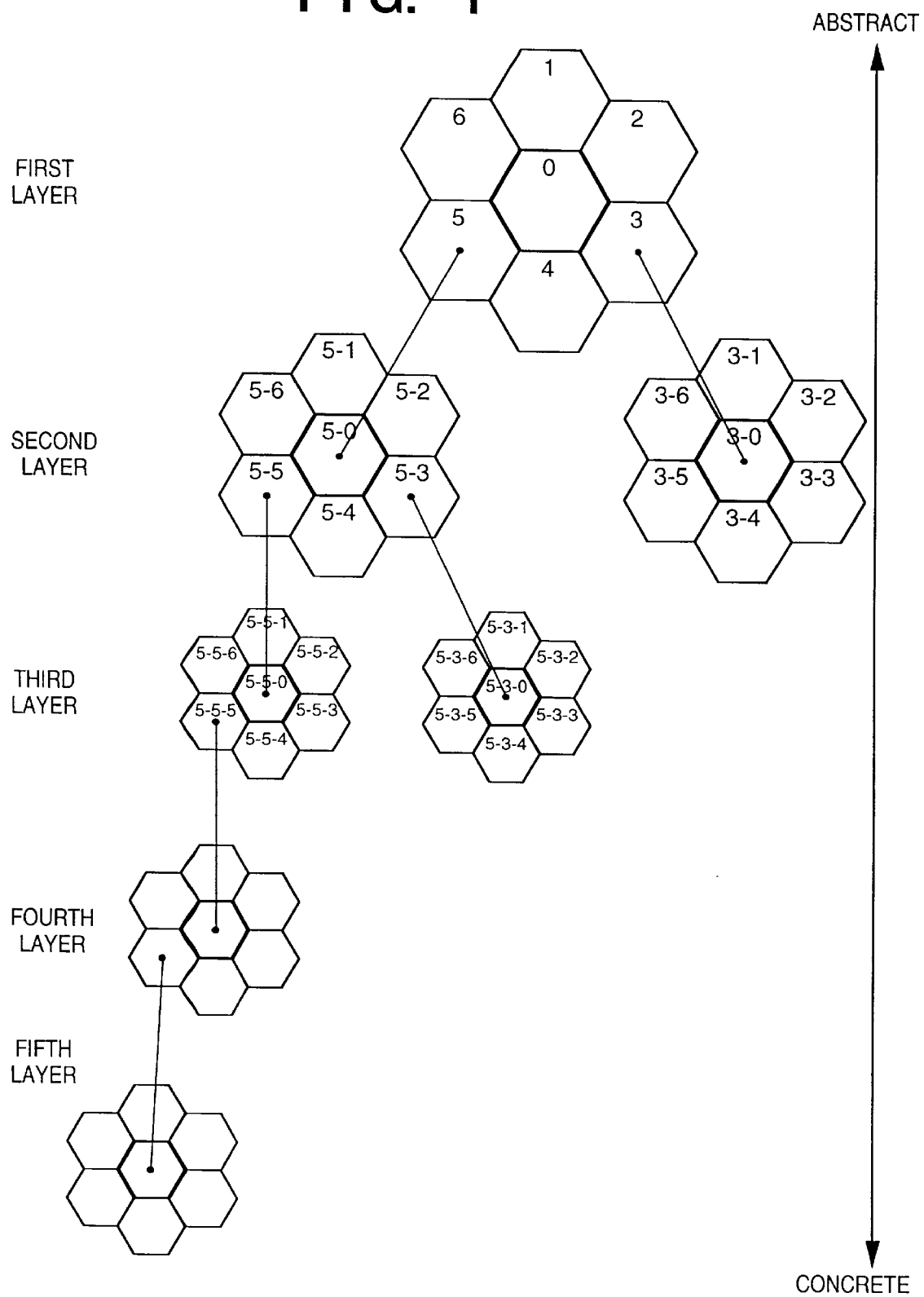
FIG. 1 shows the principle of an information organization method according to an embodiment of the present invention.

The principle of the hexagonal element extraction method will be described below. FIG. 1 shows the principle of the hexagonal element extraction method.

As shown in FIG. 1, in the hexagonal element extraction method, hexagonal theme region 0 is set to write or input a subject or the theme to be given a thought. Hexagonal first-layer element regions 1 to 6 for writing or inputting elements such as subjects, action means, and the like that come into one's mind in association with the theme written in theme region 0 are set around theme region 0 to form a first layer. Furthermore, elements that come into one's mind in association with those written in first-layer element regions 1 to 6 are defined as new subthemes, and hexagonal subtheme regions for writing or inputting such subthemes are set (in FIG. 1, the element in element region 3 is defined as a new subtheme and is set in region 3-0, and the element in element region 5 is defined as a new subtheme and is set in region 5-0). Hexagonal second-layer element regions 3-1, 3-2, . . . , 3-6, 5-1, 5-2, . . . , 5-6 for writing or inputting subjects, action means, and the like that come into one's mind in association with the subthemes written in these subtheme regions 3-0 and 5-0 are set around the subtheme regions to form a second layer. The elements such as the subjects, action means, and the like that come into one's mind are hierarchically broken down while increasing the number of layers in such procedure (breaking down into a maximum of five layers is proper), thereby easily transforming abstract elements into concrete elements. A maximum of five layers are set as divisions of breaking down, and the maximum number of divided elements and the number of elements are 9,331 through the fifth layer.

[Sheet Used in Hexagonal Element Extraction Method]

The hexagonal element extraction method uses sheets of six different styles shown in FIGS. 2 to 7 so as to describe thoughts by simply taking notes of matters that are obscurely thought upon in daily life on predetermined sheets (to be described below).

Figure 2:
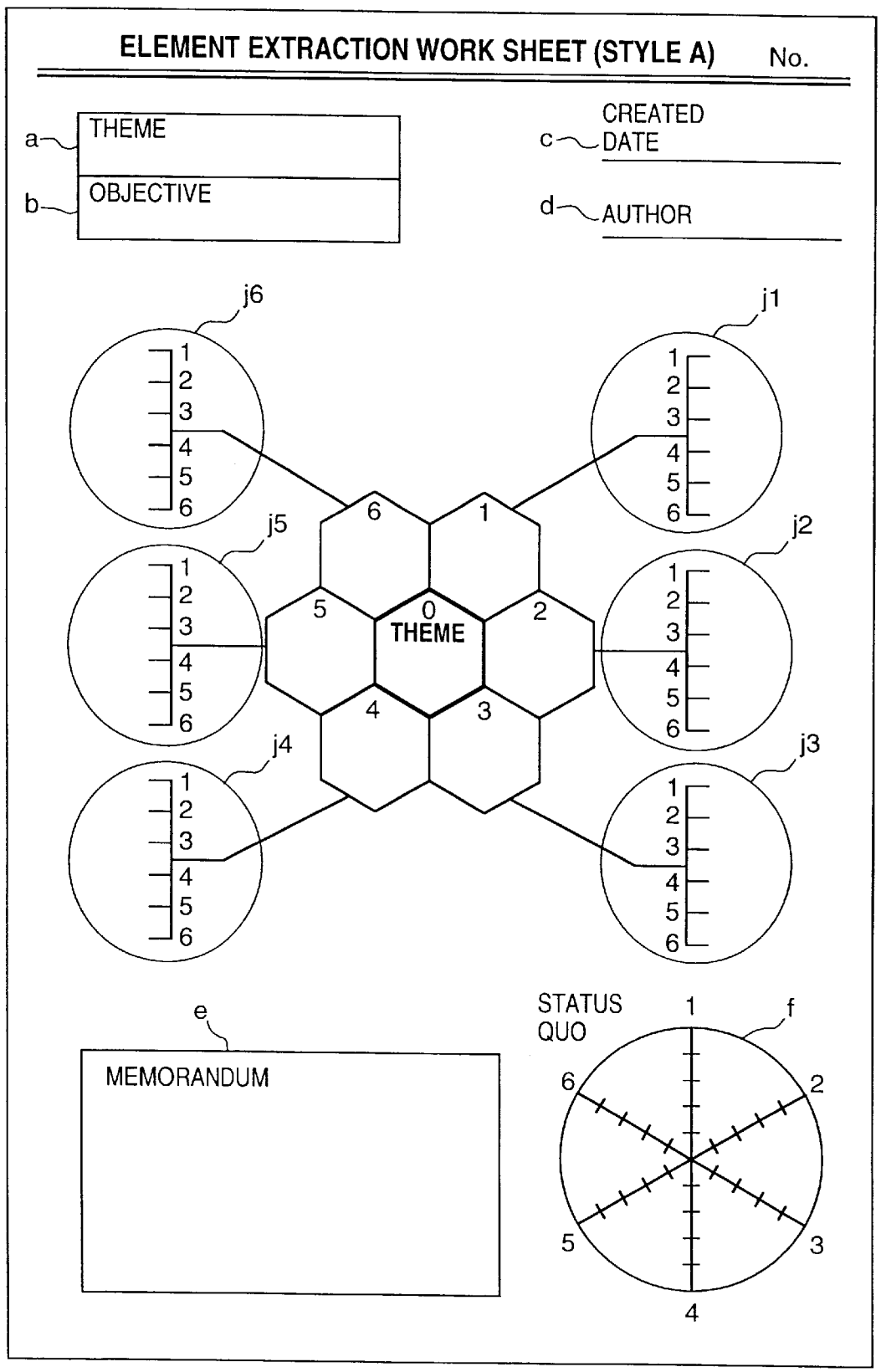
FIG. 2 shows a sheet of style A used in the information organization method according to the embodiment of the present invention.

The sheet of style A shown in FIG. 2 is the one for freely extracting and examining elements in units of themes. Hexagonal theme region 0 for writing or inputting a subject or the theme to be given a thought is set, and hexagonal first-layer element regions 1 to 6 for writing and inputting elements such as subjects, action means, and the like that come into one's mind in association with the theme written in theme region 0 are set around theme region 0. Furthermore, elements that come into one's mind in association with the elements written in first-layer element regions 1 to 6 are defined as new subthemes, and second-layer element regions j1 to j6 each of which is divided into six blocks for writing or inputting elements such as subjects, action means, and the like that come into one's mind in association with each subtheme are set to stem from first-layer element regions 1 to 6. Furthermore, a theme block a, objective block b, date block c, author block d, memorandum e, and current-degree-of-achievement chart f are formed. Since the second-layer element regions do not have a hexagonal shape, large blank regions can be assured, and elements can be freely extracted.

Figure 3A:
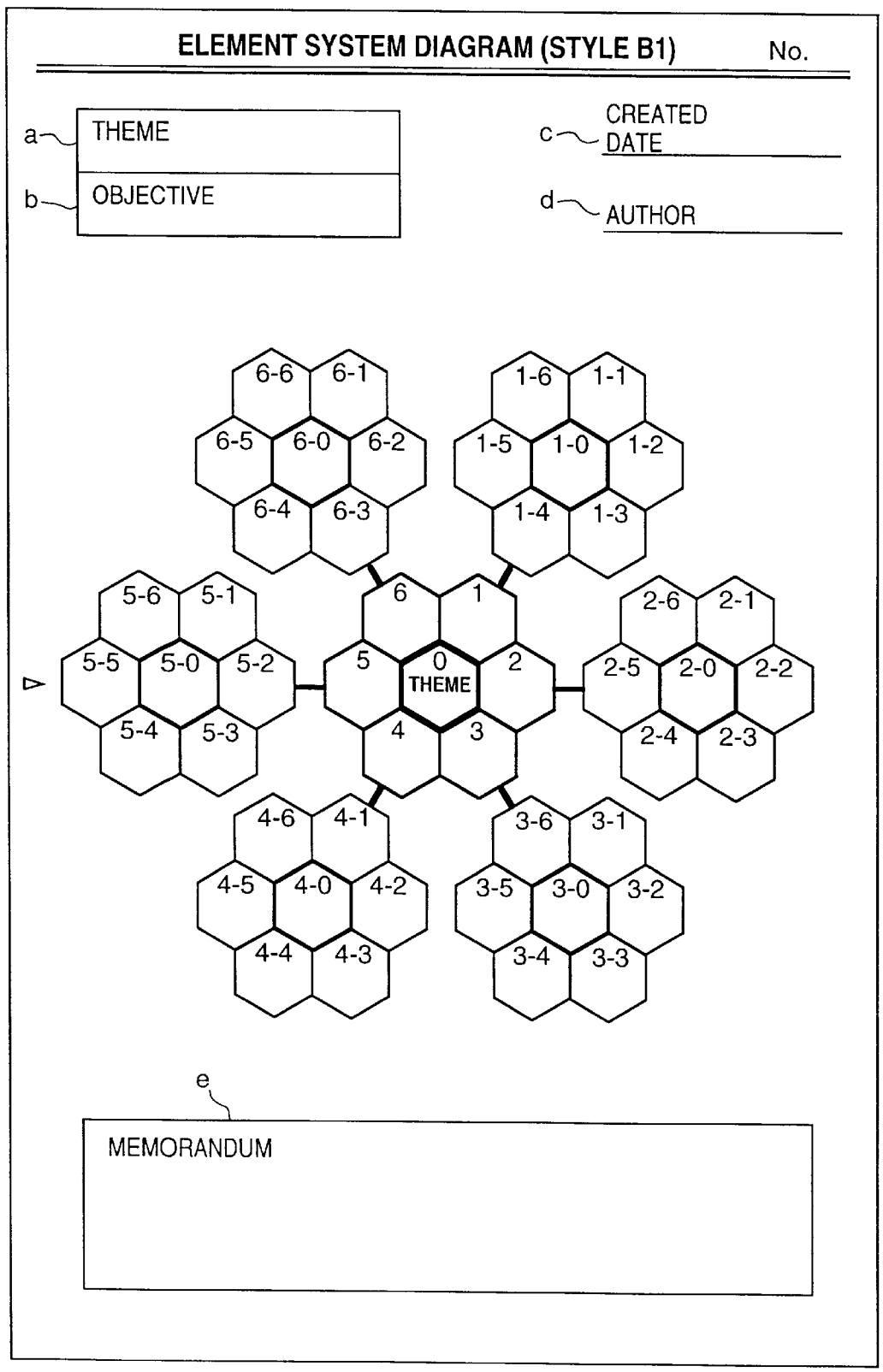
FIG. 3A shows a sheet of style B1 used in the information organization method according to the embodiment of the present invention.

The sheet of style B1 shown in FIG. 3A is filled after elements have been arranged orderly in style A, and is used for breaking down the elements up to the second layer. On the sheet of style B1, hexagonal theme region 0 for writing or inputting the subject or theme to be given a thought is set, and first-element hexagonal element regions 1 to 6 for writing and inputting elements such as subjects, action means, and the like that come into one's mind in association with the theme written in theme region 0 are set around theme region 0 to form the first layer. Furthermore, the elements that occur in association with the elements written in first-layer element regions 1 to 6 are defined as new subthemes, and hexagonal subtheme regions 1-0, 2-0, 3-0, . . . , 6-0 for writing and inputting these subthemes are set. Around these subtheme regions, hexagonal second-layer element regions 1-1 to 1-6, 2-1 to 2-6, 3-1 to 3-6, . . . , 6-1 to 6-6 for writing and inputting elements such as subjects, action means, and the like that come into one's mind in association with subthemes written in subtheme regions 1-0, 2-0, 3-0, . . . , 6-0 are set to form the second layer. First-layer element regions 1 to 6 and second-layer element regions 1-1 to 1-6, 2-1 to 2-6, 3-1 to 3-6, . . . , 6-1 to 6-6 are set to be separated by predetermined intervals. Furthermore, the sheet of style B1 has a theme block a, objective block b, date block c, author block d, and memorandum e. In this manner, since the theme region, first-layer element regions, and second-layer element regions have a hexagonal shape, the individual elements can be recognized by visually looking at them, can be easily memorized, and can be easily understood by a third party, thus avoiding omission of elements to be extracted.

Figure 3B:
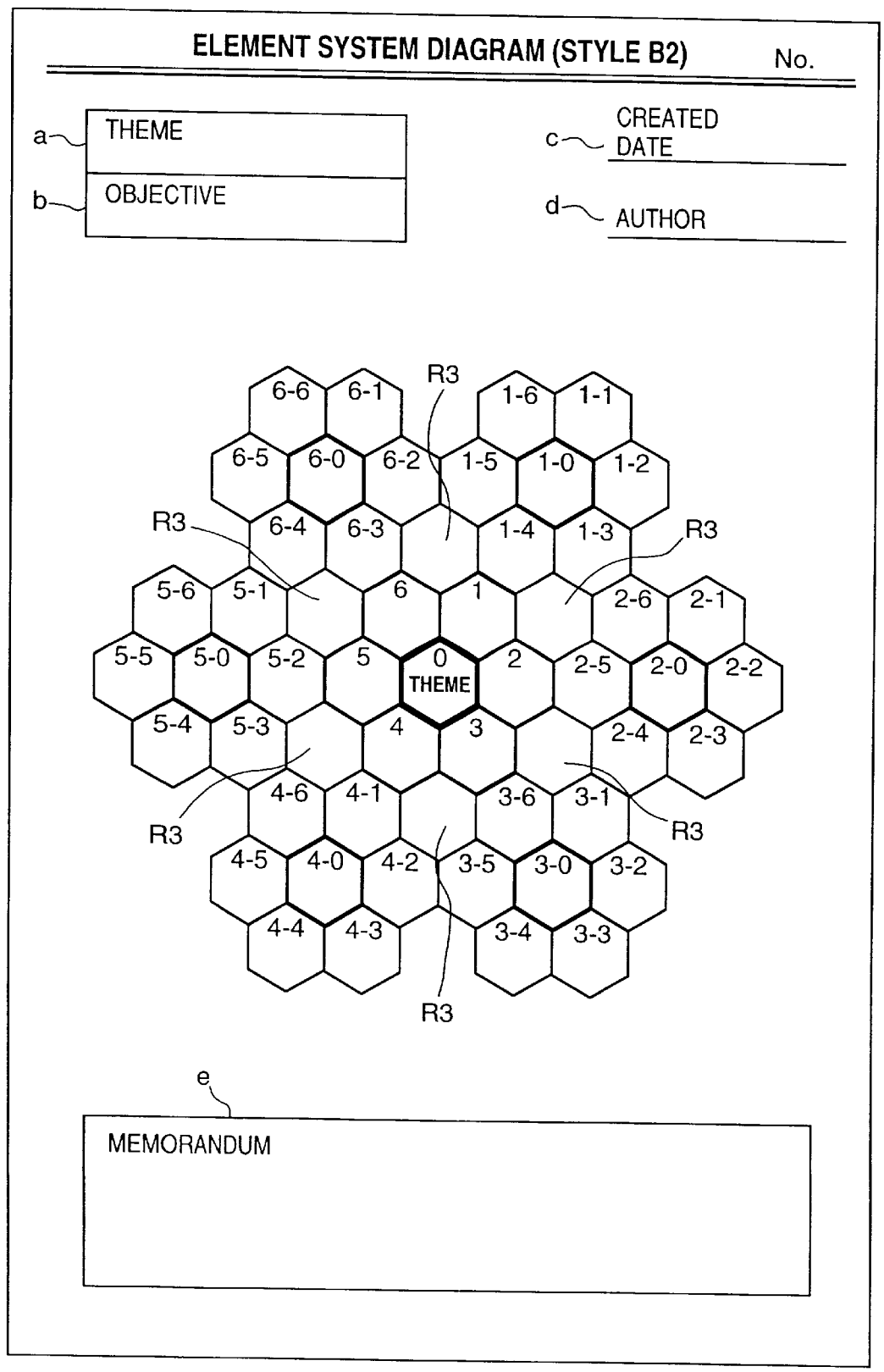
FIG. 3B shows a sheet of style B2 used in the information organization method according to the embodiment of the present invention.

On the sheet of style B2 shown in FIG. 3B, first-layer element regions 1 to 6 and second-layer element regions 1-1 to 1-6, 2-1 to 2-6, 3-1 to 3-6, . . . , 6-1 to 6-6 of the sheet of style B1 are set adjacent to each other, and hexagonal blank regions R3 are formed on portions surrounded by first-layer element regions 1 to 6 and second-layer element regions 1-1 to 1-6, 2-1 to 2-6, 3-1 to 3-6, . . . , 6-1 to 6-6. With this sheet of style B2, as in the sheet of style B1, since the individual elements can be recognized by visually looking at them, they can be easily memorized and can be easily understood by a third party, thus avoiding omission of elements to be extracted.

Figure 4:
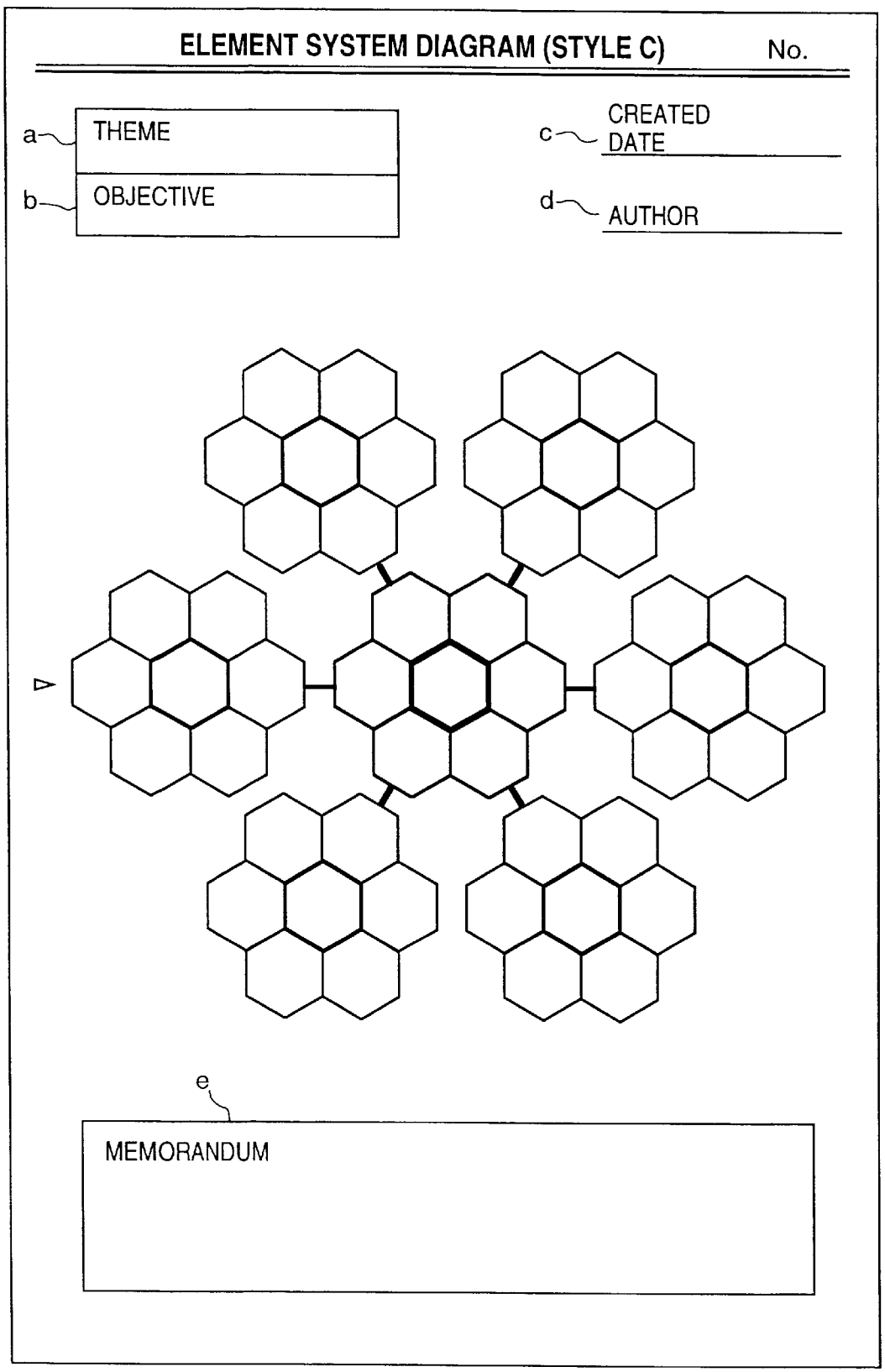
FIG. 4 shows a sheet of style C used in the information organization method according to the embodiment of the present invention.

The sheet of style C shown in FIG. 4 is used for further proceeding with breaking down into the third and subsequent layers. On this sheet, element regions can be freely set, so that the elements that come into one's mind in association with those written in second-layer element regions 1-1 to 1-6, 2-1 to 2-6, 3-1 to 3-6, . . . , 6-1 to 6-6 shown in FIG. 3A are defined as new subthemes, hexagonal third-layer subtheme regions for writing or inputting these subthemes are set, and hexagonal third-layer element regions for writing and inputting elements such as subjects, action means, and the like that come into one's mind in association with the sub themes written in these third-layer subtheme regions are set around the third-layer subtheme regions. Other arrangements are the same as those of the sheet of style B1.

Figure 5:
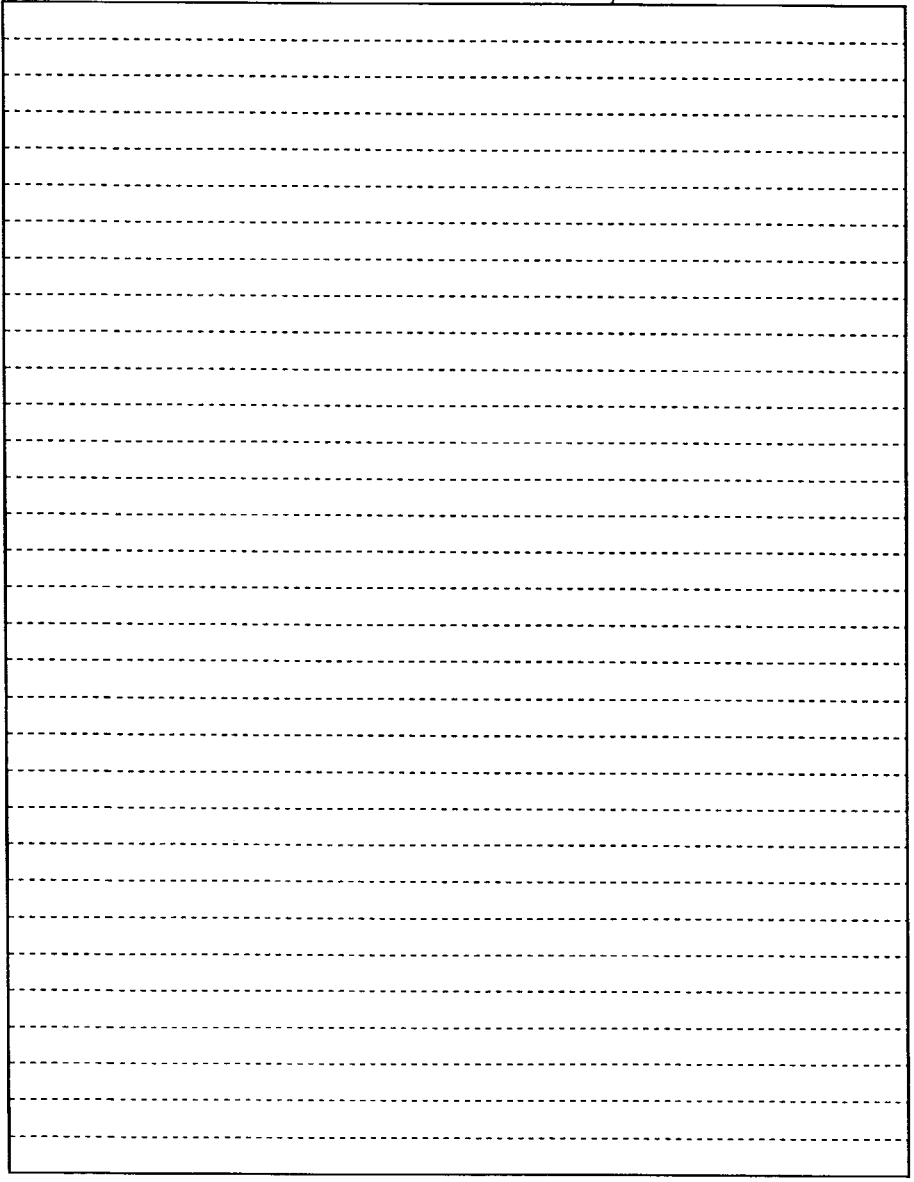
FIG. 5 shows a sheet of style D used in the information organization method according to the embodiment of the present invention.

The sheet of style D shown in FIG. 5 is used for writing the contents of the theme or element written in the sheet of style A, B1, or B2 in more detail (e.g., an example of a document, design, still image, or the like associated with the theme or element), the form and contents of a medium that stores the document (to be described layer in the third embodiment), the job instruction contents, and the like. The sheet of style D has a code NO. block g, type block h, and memorandum i so as to easily organize the contents of the element, and the type block h includes items such as a document, design, still image, moving image, sound, and the like.

Figure 6:
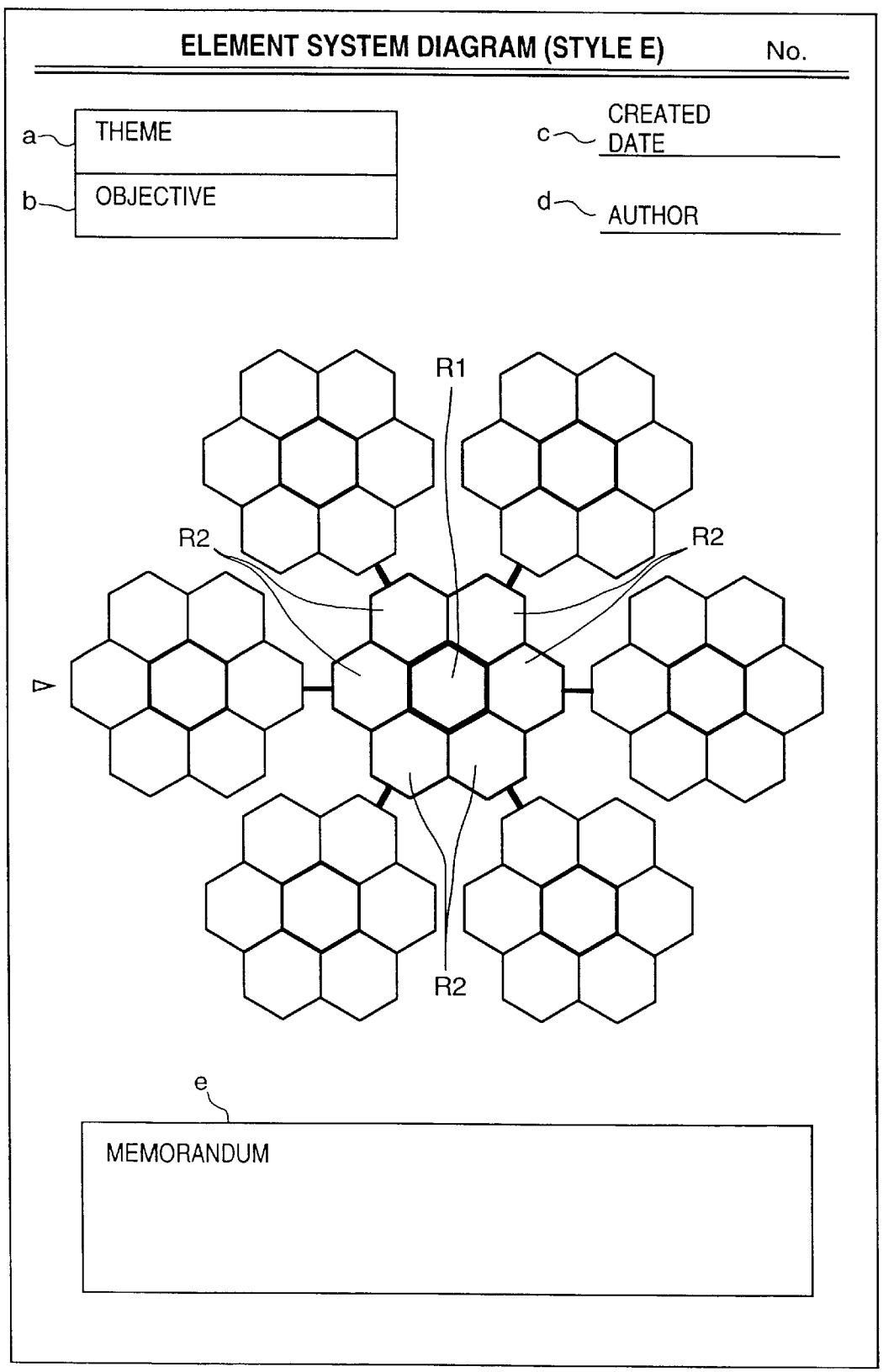
FIG. 6 shows a sheet of style E used in the information organization method according to the embodiment of the present invention.

The sheet of style E shown in FIG. 6 is obtained by enlarging the sheet of style C to, e.g., A2 size, and is effective upon examining the theme by a plurality of persons in, e.g., a meeting. The sheet of style E has a theme adhesion region Rl and element adhesion regions R2 as in the sheet of style C, and the elements can be examined while adhering the extracted elements that are written on divided adhesive sheets using the sheet of style F shown in FIG. 7 onto the regions R1 and R2.

Figure 7:
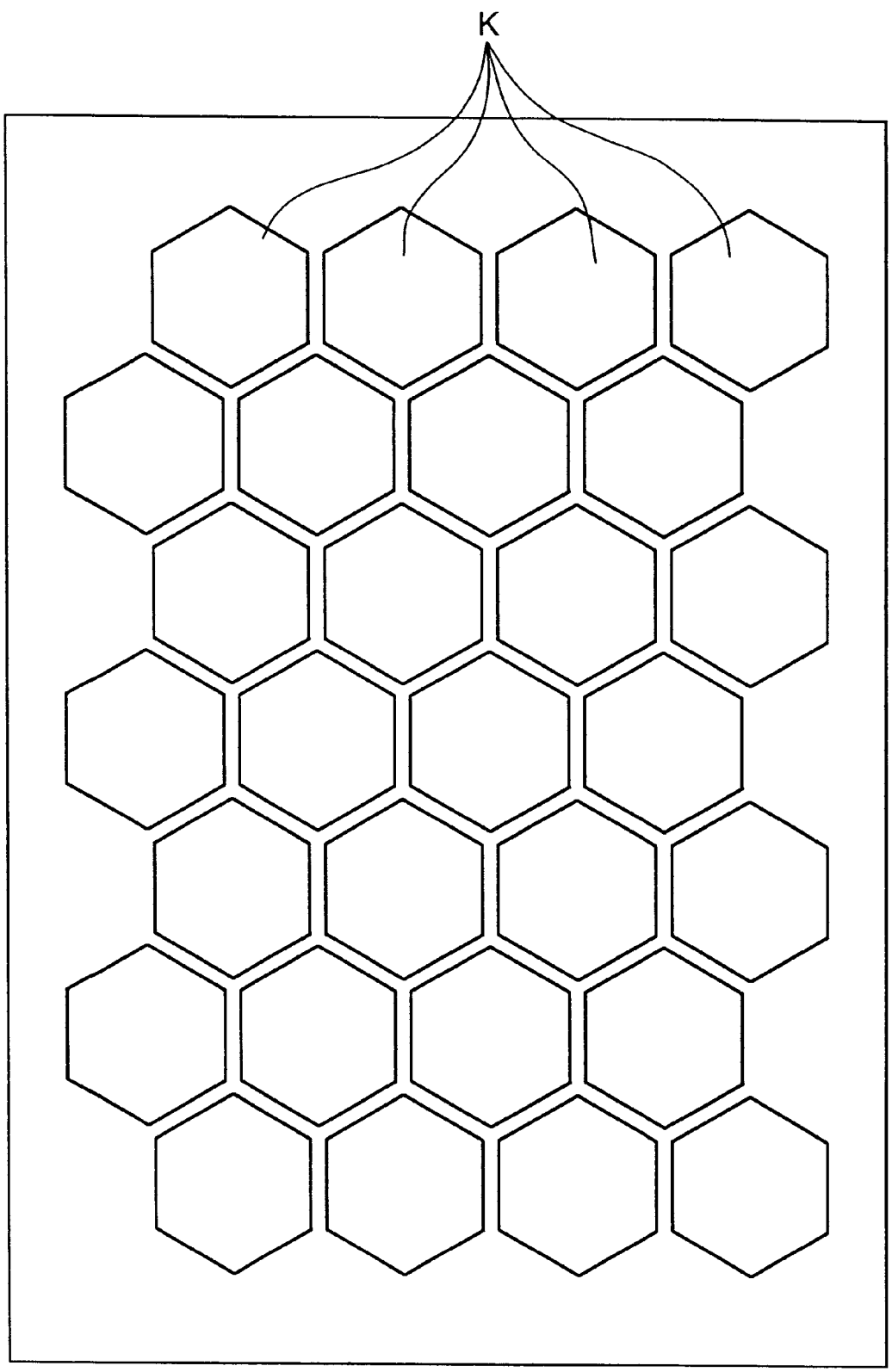
FIG. 7 shows a sheet of style F used in the information organization method according to the embodiment of the present invention.

The sheet of style F shown in FIG. 7 provides divided adhesive sheets, and is used in place of the sheet of style A. The elements are written on divided adhesive sheets k, and are adhered onto the theme and element regions on the sheet of style E so as to organize the extracted elements. In addition, since these adhesive sheets are classified by colors, the theme and elements are easy to recognize when they are adhered onto the sheet of style E.

As described above, the theme to be given a thought is set as a hexagonal core, the elements, action means, and the like that come into one's mind in association with the set theme are broken down into six hexagons to form the first layer, and the elements that occur in the first layer are defined as new cores and the elements, action means, and the like that come into one's mind in association with these new cores are further broken down into six each hexagons around the cores to form the second layer. In this manner, the number of layers is increased and the elements, action means, and the like that come into one's mind can be hierarchically broken down, thus easily transforming abstract elements into concrete elements.

[Information Organization Method of First Embodiment]

A case will be exemplified as the first embodiment upon executing the hexagonal element extraction method in practice wherein the sheets of styles A, B1, C, and D are used.

Figure 10:
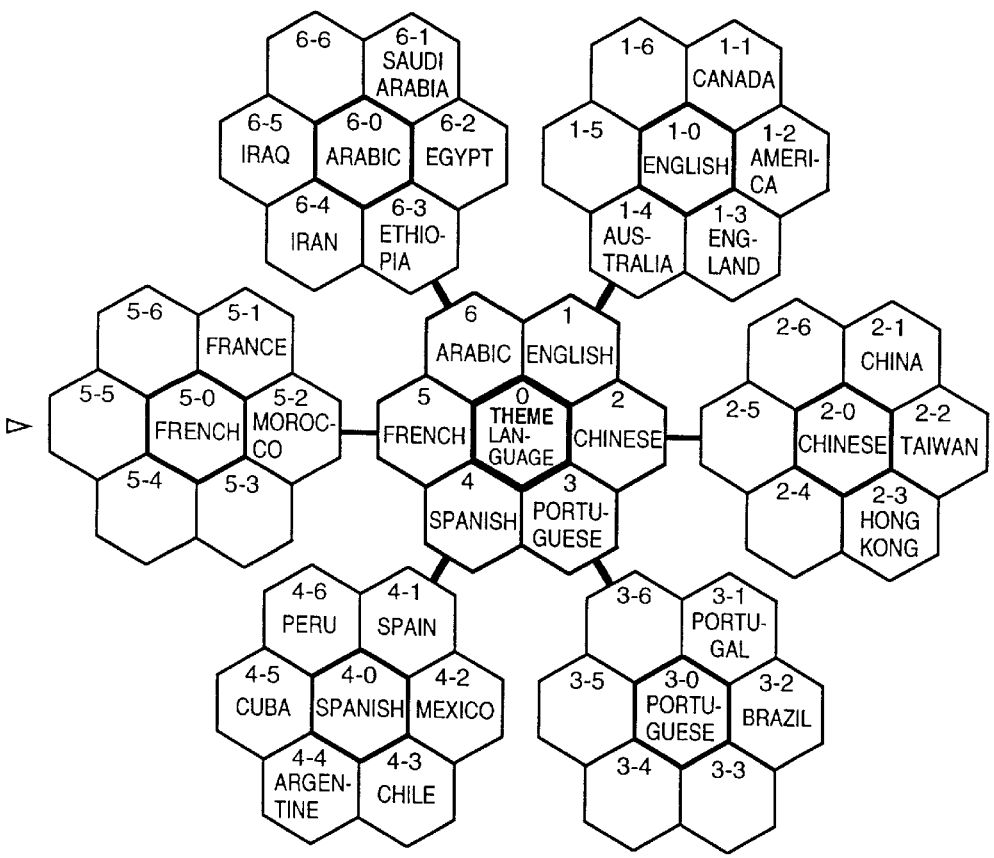
FIG. 10 shows the sheet of style B1 with the execution result of the information organization method of the first embodiment.

FIG. 8 is a flow chart showing the execution procedure of the information organization method of the first embodiment. FIGS. 9A to 9C show the sheets of style A with the execution results of the information organization method of the first embodiment. FIG. 10 shows the sheet of style B1 with the execution result of the information organization method of the first embodiment.

As shown in FIG. 8, a theme is determined in step S2, and is written in the theme block a and theme region 0 on the sheet of style A in step S4. As shown in FIG. 9A, in this embodiment, in order to organize information in association with language zones, "language" is assumed to be determined as a theme, and is written in the theme block a and theme region 0 on the sheet of style A. Thereafter, elements that occur from the determined theme are extracted in step S6, and are written in first-layer element regions 1 to 6 of the sheet of style A in step S8. As shown in FIG. 9B, "English", "Chinese", "Portuguese", "Spanish", "French", and "Arabic" are extracted as elements, and are written in first-layer element regions 1 to 6. Also, as shown in FIG. 9B, the degrees of achievements of subjects and the like written in first-layer element regions 1 to 6 are evaluated using some levels (5 levels in FIG. 9B), and are written on current degree-of-achievement chart f on the sheet of style A. In this manner, the degrees of achievement of subjects, and the like can be visually presented, and can be easily recognized. In steps S2 to S8, elements of the first layer are extracted. Furthermore, new elements that come into one's mind from the elements extracted from the theme as new subthemes are extracted in step S10, and are written in second-layer element regions j on the sheet of style A in step S12. As shown in FIG. 9C, in this embodiment, "Canada", "America", "England", and "Australia" are written in second-layer element region j1 on the basis of subtheme "English"; "China", "Taiwan", and "Hong Kong" are written in second-layer element region j2 on the basis of subtheme "Chinese"; "Portugal" and "Brazil" are written in second-layer element region j3 on the basis of subtheme "Portuguese"; "Spain", "Mexico", "Chile", "Argentine", "Cuba", and "Peru" are written in second-layer element region j4 on the basis of subtheme "Spanish"; "France" and "Morocco" are written in second-layer element region j5 on the basis of subtheme "French"; and "Saudi Arabia", "Egypt", "Ethiopia", "Iran", and "Iraq" are written in second-layer element region j6 on the basis of subtheme "Arabic". In steps S10 and S12, the elements in the second layer are extracted.

If it is determined in step S14 that all the elements have been extracted (YES in step S14), the flow advances to step S16. If it is determined in step S16 that elements in the third layer or higher are not extracted (NO in step S16), the flow advances to step S18, and all the elements written in the sheet of style A are written in the sheet of style B1 (see FIG. 10). On the other hand, if it is determined in step S14 that still other elements are to be extracted (NO in step S14), the flow returns to step S10. In step S10, elements that come into one's mind using the individual elements in second-layer element regions j1 to j6 as new subthemes are extracted. Subsequently, in step S12, each of the new subthemes is written in region 0 of another sheet of style A, and elements as those in the third layer are written in first-layer element regions 1 to 6. In steps S10 and S12 executed after the flow returns from step S14, elements in the third and subsequent layers are extracted.

If it is determined in step S16 that the elements up to the third layer have been extracted (YES in step S16), the flow advances to step S20. In step S20, the elements up to the second layer, which are written on the sheet of style A are written on the sheet of style B1, and the elements in the third and subsequent layers are written on the sheet of style C (see FIG. 10). Thereafter, in step S22, the contents of the individual elements are examined using sheets of style D, thus ending the execution procedure of the first embodiment.

[Information Organization Method of Second Embodiment]

A case will be exemplified as the second embodiment upon executing the hexagonal element extraction method in practice wherein the sheets of styles B1, C, D, E, and F are used.

Figure 11:
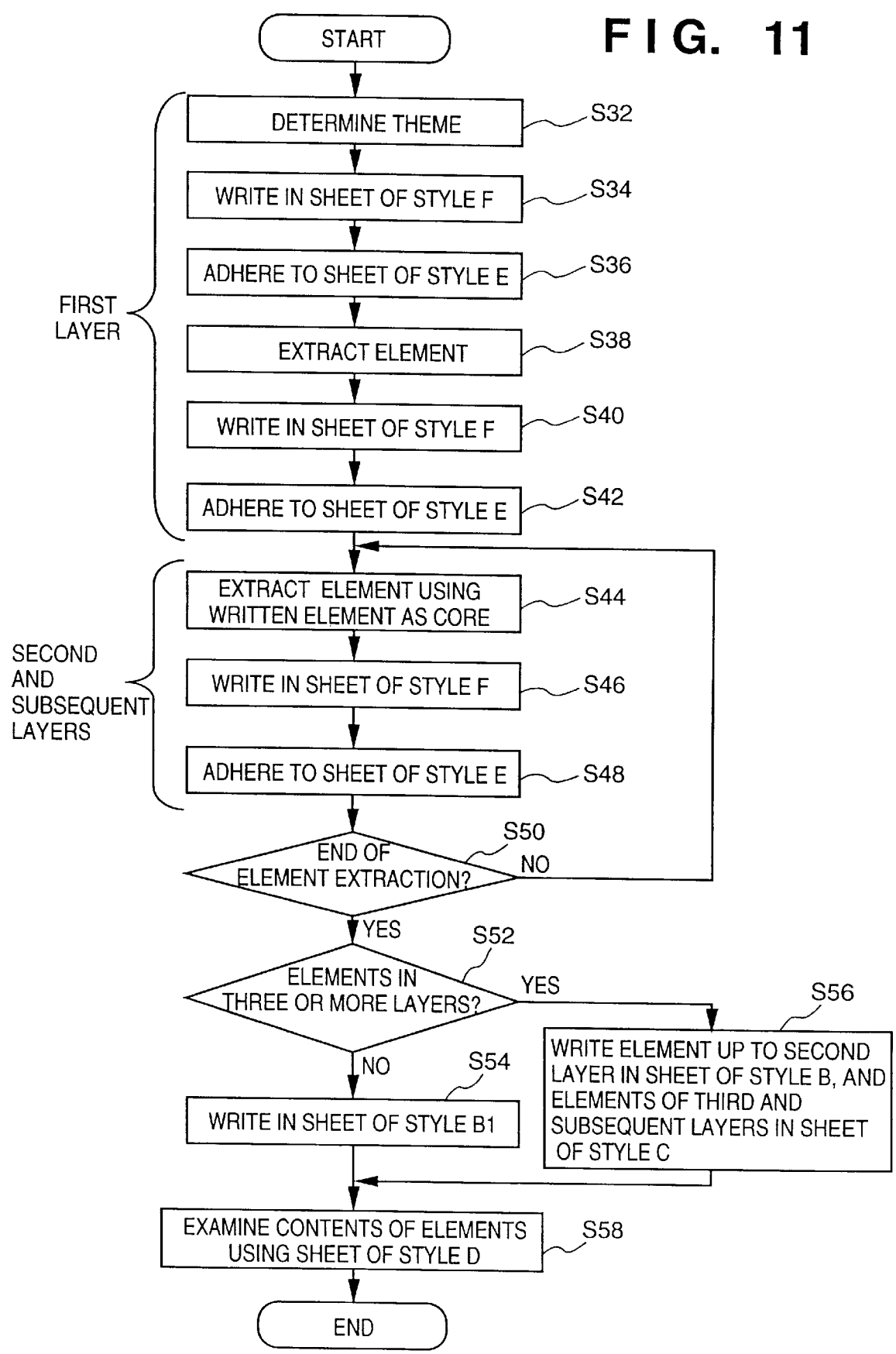
FIG. 11 is a flow chart showing the execution procedure of an information organization method according to the second embodiment of the present invention.
Figure 12:
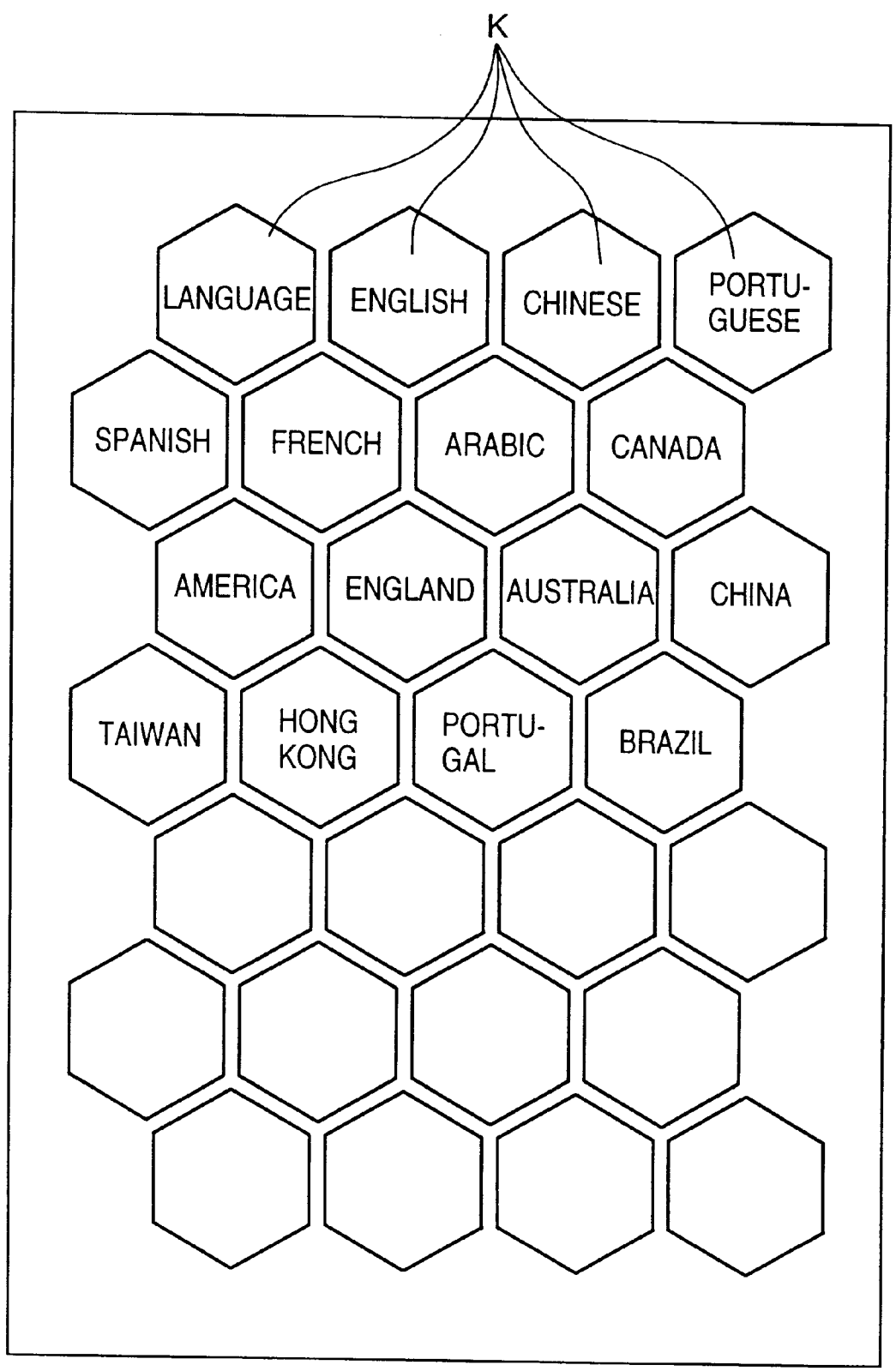
FIG. 12 shows the sheet of style F with the execution result of the information organization method of the second embodiment.
Figure 13:
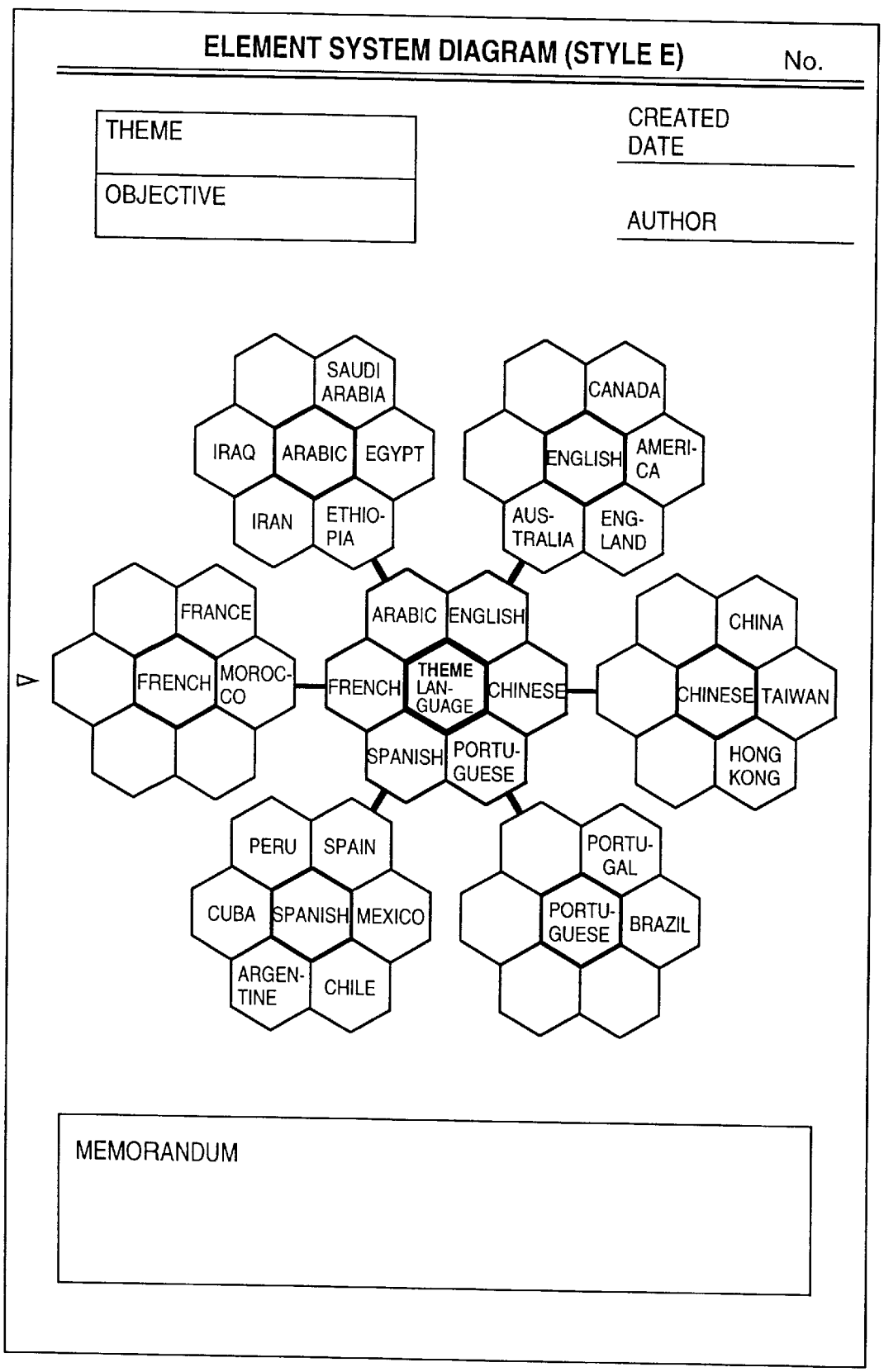
FIG. 13 shows the sheet of style E with the execution result of the information organization method of the second embodiment.

FIG. 11 is a flow chart showing the execution procedure of the information organization method according to the second embodiment of the present invention. FIG. 12 shows the sheet of style F with the execution result of the information organization method of the second embodiment. FIG. 13 shows the sheet of style E with the execution result of the information organization method of the second embodiment.

As shown in FIG. 11, a theme is determined in step S32, and is written on divided adhesive sheet k of the sheet of style F in step S34. Furthermore, the divided adhesive sheet k written with the theme is adhered onto the theme adhesion region of the sheet of style E in step S36. As shown in FIG. 12, in this embodiment, "language" is determined as a theme, and is written on divided adhesive sheet k of the sheet of style F. Thereafter, the adhesive sheet written with the theme is adhered onto the theme adhesion region of the sheet of style E. Thereafter, elements that occur from the determined theme are extracted in step S38, and are written on divided adhesive sheets K of the sheet of style F in step S40. In step S42, these adhesive sheets are adhered onto the-element adhesion region of the sheet of style E. As shown in FIG. 12, in this embodiment, "English", "Chinese", "Portuguese", "Spanish", "French", and "Arabic" are extracted on the basis of theme "language", and are written on divided adhesive sheets k of the sheet of style F. These adhesive sheets are adhered onto the element adhesion region of the sheet of style E. In steps S32 to S42, elements of the first layer are extracted. Furthermore, in step S44, elements that come into one's mind from the elements extracted from the theme as new subthemes are extracted. These extracted elements are written on divided adhesive sheets k of the sheet of style F in step S46, and these adhesive sheets are adhered onto the element adhesion regions of the sheet of style E in step S48. As shown in FIG. 13, in this embodiment, new elements that come into one's mind from new subthemes "English", "Chinese", "Portuguese", "Spanish", "French", and "Arabic" are extracted, as shown in FIG. 12, and are written on divided adhesive sheets of the sheet of style F. These adhesive sheets are then adhered onto the element adhesion region of the sheet of style E. In steps S44 to S48, elements of the second layer are extracted.

If it is determined in step S50 that all the elements have been extracted (YES in step S50), the flow advances to step S52. If it is determined in step S52 that elements up to the third layer are not extracted (NO in step S52), the flow advances to step S54 to write all the elements adhered onto the sheet of style E on the sheet of style B1 (see FIG. 10). On the other hand, if it is determined in step S50 that still other elements are to be extracted (NO in step S50), the flow returns to step S44. In step S44, elements that come into one's mind from those extracted in the second layer as new subthemes are extracted. In steps S46 and S48, these elements are written on divided adhesive sheets k of the sheet of style F, and are adhered to the element adhesion regions of another sheet of style E. In steps S44 and S48 executed after the flow returns from step S50, elements in the third and subsequent layers are extracted.

If it is determined in step S52 that the elements up to the third layer have been extracted (YES in step S52), the flow advances to step S56. In step S56, the elements up to the second layer organized on the sheet of style E are written on the sheet of style B1, and the elements of the third and subsequent layers are written on the sheet of style C. Thereafter, the contents, media, and the like of the individual elements are examined using sheets of style D, thus ending the execution procedure of this embodiment.

[Information Organization Method of Third Embodiment]

Figure 14:
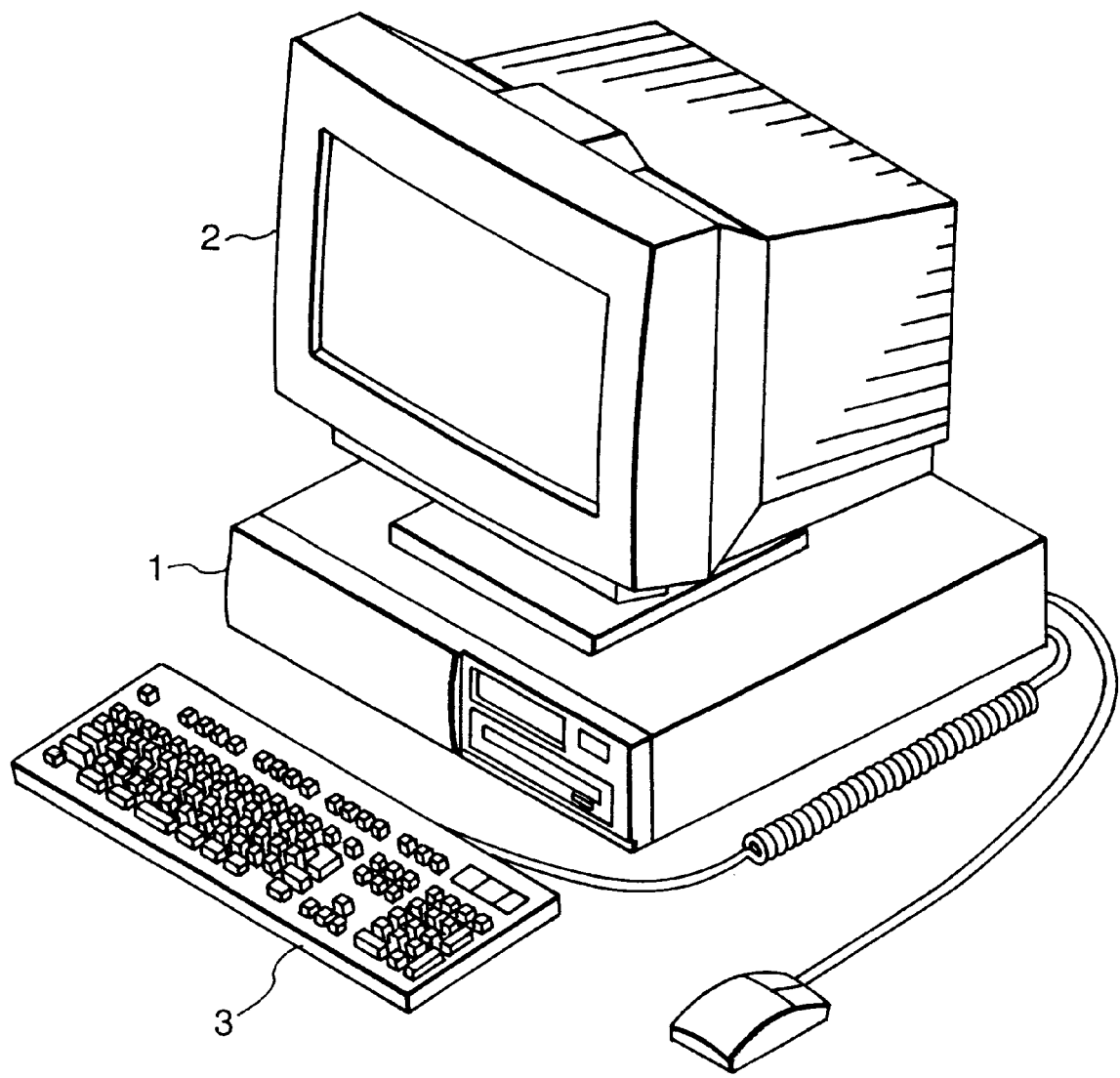
FIG. 14 is a perspective view showing an external appearance of a computer system used in an information organization method according to the third embodiment of the present invention.
Figure 15:
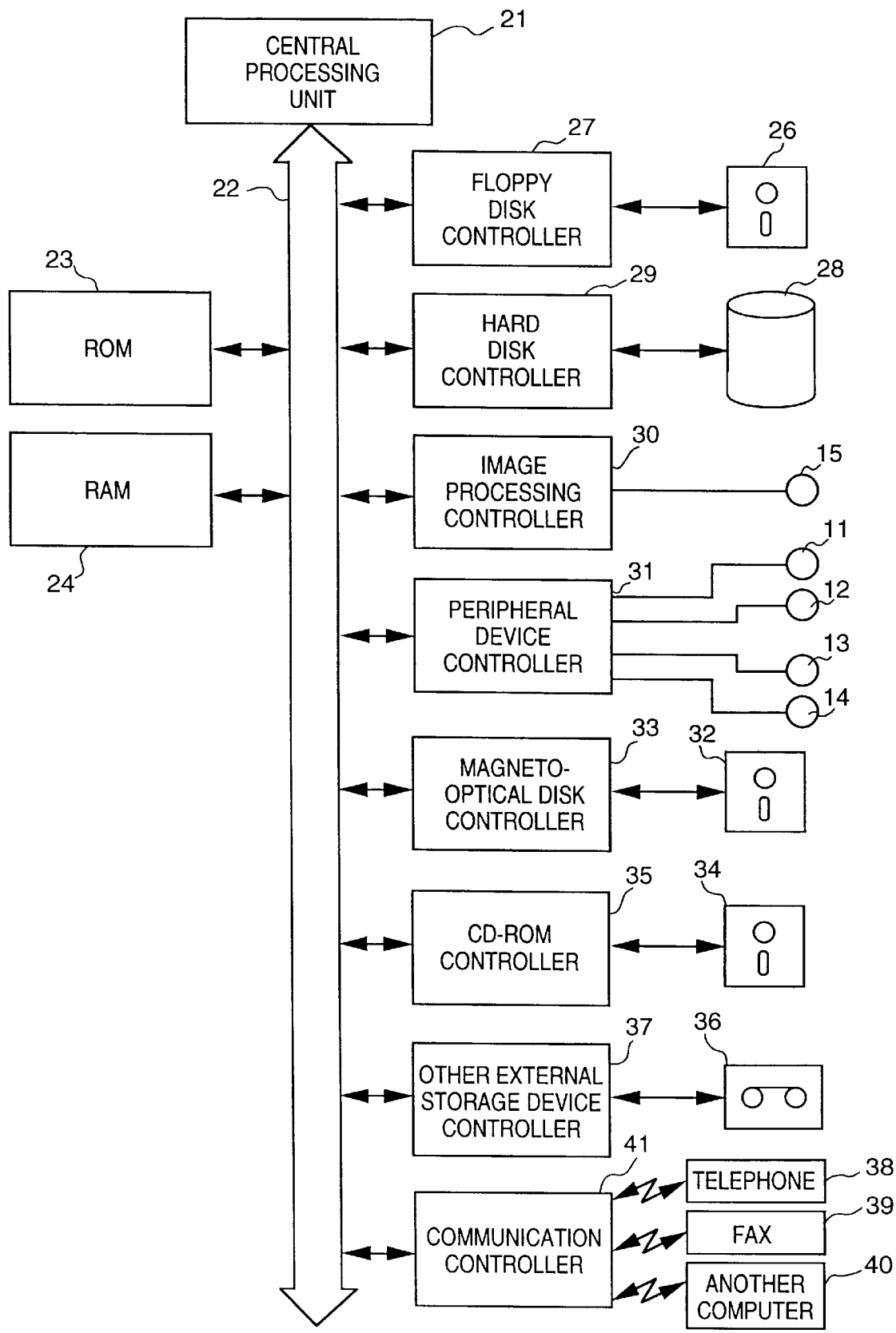
FIG. 15 is a block diagram of the computer system shown in FIG. 14.

A case will be described below as the third embodiment wherein the hexagonal element extraction method is applied to a computer system. FIG. 14 is a perspective view showing the outer appearance of a computer system used in the third embodiment. FIG. 15 is a block diagram showing the computer system shown in FIG. 14.

As shown in FIG. 14, the computer system is mainly constituted by a computer main body 1, a monitor 2, a keyboard 3, a mouse 4, and a modem 5.

As shown in FIG. 15, the principal control in the computer main body 1 is executed by a central processing unit 21 that processes digital information. The central processing unit 21 is connected to a system bus 22 including address lines, data lines, and control lines.

The system bus 22 is connected to a ROM (Read Only Memory) 23 as a read-only memory, and a RAM (Random Access Memory) 24 as a memory in/from which externally input commands and data can be written and read out. The ROM 23 stores a program for activating the computer main body 1.

The system bus 22 is also connected to a floppy disk 26 used for recording and storing data via a floppy disk controller 27, a magneto-optical disk 32 via a magneto-optical disk controller 33, and other external storage devices (cassette tape and the like) 36 via other external device controllers 37. Furthermore, the system bus 22 is connected to a hard disk 28 which has a capacity larger than the floppy disk 26 and allows high-speed read/write accesses, via a hard disk controller 29, a monitor port 15 for outputting character and image data to the monitor 2 via an image processing controller 30, a CD-ROM 34 that stores a database and the like via a CD-ROM controller 35, and to a mouse port 11, a keyboard port 12, a serial port 13, and a parallel port 14 via a peripheral device controller 31 for processing the individual functions. Moreover, the system bus 22 is connected to a communication controller 41, which is connected to a telephone 38, a FAX 39, and another computer 40 via a communication line.

Note that the program for executing the hexagonal element extraction method in the computer system is written in the hard disk 28 or the ROM 23.

<Functions Operable on Display Screen>

The functions that can be operated on the display screen of the computer system will be explained below. FIGS. 16 to 21 show display screen images when the program of the hexagonal element extraction method is executed by the computer system shown in FIG. 14.

Figure 16:
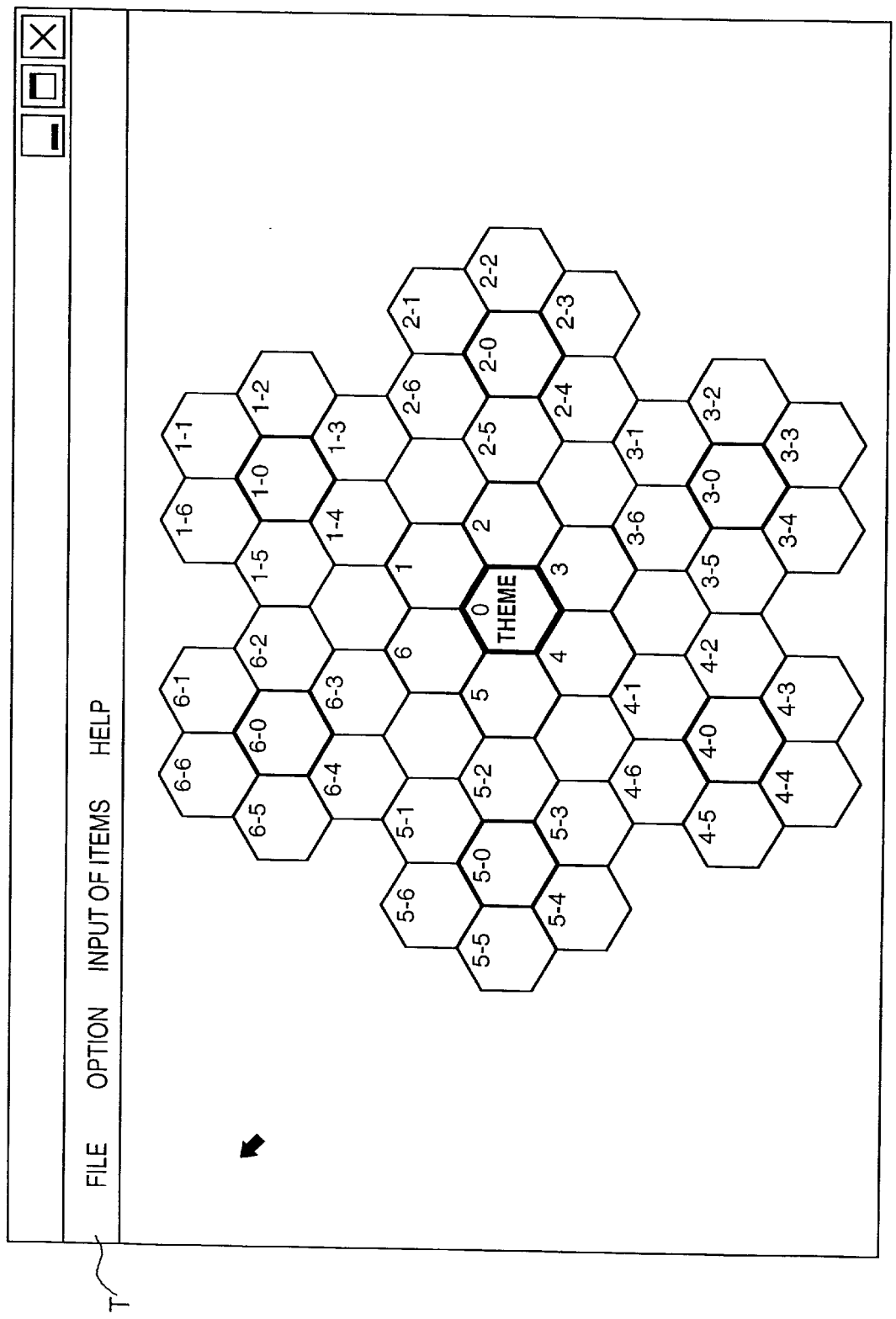
FIGS. 16 to 21 show display screen images upon execution of an information organization method program in the computer system shown in FIG. 14.
Figure 17:
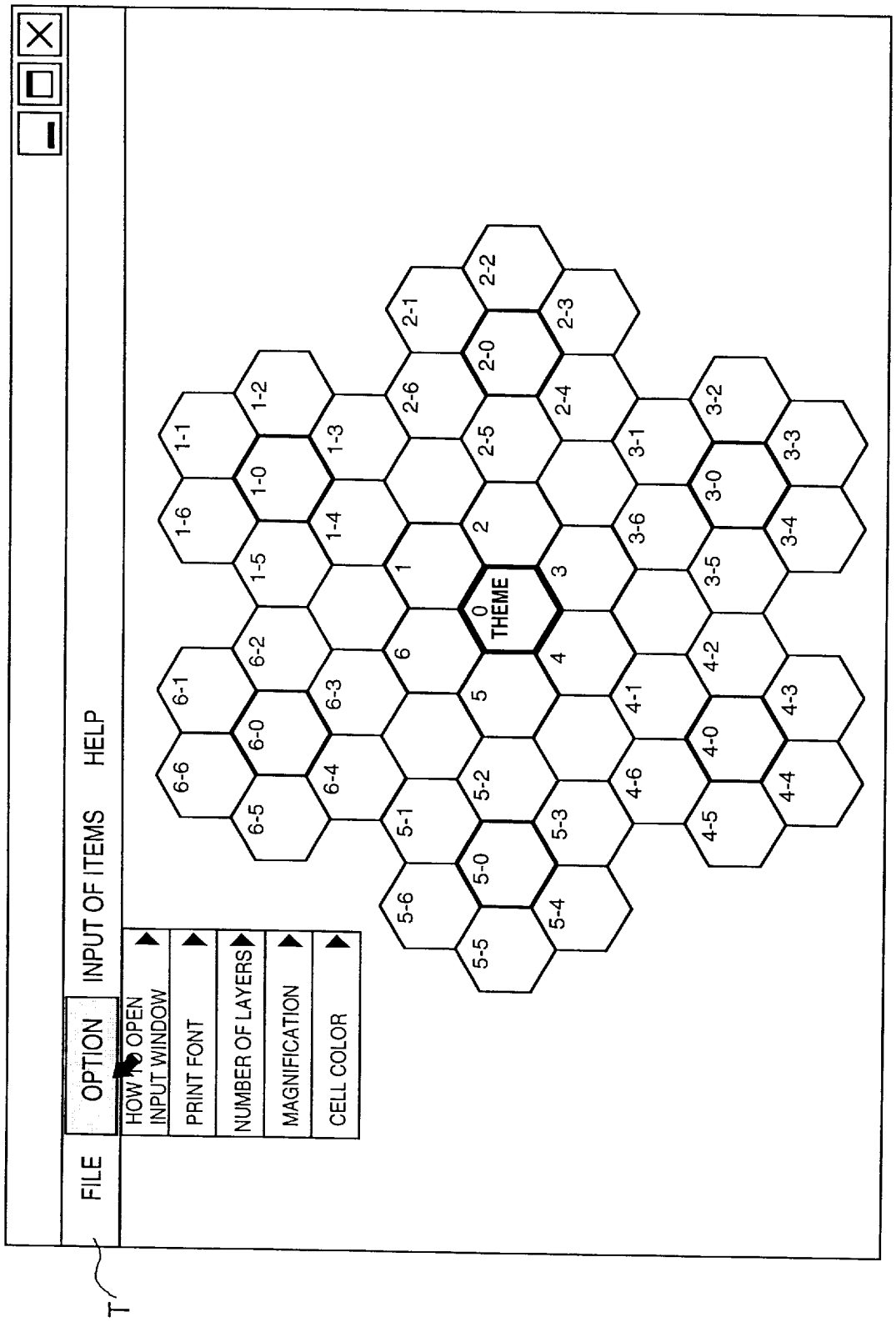

As shown in FIG. 16, when the program of the hexagonal element extraction method is started, an element system diagram in the hexagonal element extraction method is displayed on the monitor. On this element system diagram, hexagonal theme input cell 0 for inputting a theme, six hexagonal first-layer element input cells 1 to 6 which are set around theme input cell 0 and are used for inputting elements, action means, and the like that come into one's mind from the theme, hexagonal subtheme input cells 1-0, 2-0, 3-0, . . . , 6-0 for inputting the elements that occurred in first-layer element input cells 1 to 6 as new subthemes, and six each hexagonal second-layer element input cells 1-1 to 1-6, 2-1 to 2-6, . . . , 6-1 to 6-6 which are set around subtheme input cells 1-0, 2-0, 3-0, . . . , 6-0 and are used for inputting elements, action means, and the like that come into one's mind from these subthemes, are displayed. That is, second-layer element input cells 1-1 to 1-6, 2-1 to 2-6, . . . , 6-1 to 6-6 are displayed adjacent to first-layer element input cells 1 to 6, and adjacent regions of second-layer element input cells 1-1 to 1-6, 2-1 to 2-6, . . . , 6-1 to 6-6 are also displayed adjacent to each other to form a honeycomb pattern. On the other hand, when data inputtable cells (to be described later) are set in three or more layers, cells in the third layer or higher that are identical with those in the second layer or lower are displayed to be superposed thereon. In order to input data in each cell, when the cell is clicked by the mouse, a data input window opens, and data can be input from the keyboard.

An operation selection display portion T is displayed above the element system diagram extending in the widthwise direction of the screen, and "file", "option", "input of items", and "help" are displayed as main operations selected at the operation selection display portion T. When one of these menu items is clicked by the mouse, a detailed operation menu associated with the corresponding main operation is displayed, and an arbitrary operation can be selected.

(File Operation)

When "file" on the operation selection display portion T is clicked by the mouse, an operation menu for executing operations such as creating a new file, reading an existing file, updating a file, saving a file, printing, and exit from the program, and the like is displayed (not shown).

(Option Operation)

When "option" on the operation selection display portion T is clicked by the mouse, operation menu items "how to open input window", "print font", "number of layers", "magnification", and "cell color" are displayed. Of these operation menu items, at menu item "how to open input window", how to open the input window used for inputting data into each cell displayed on the screen can be selected. At menu item "print font", the font of data to be input to each cell, and the font upon printing can be selected.

Figure 18:
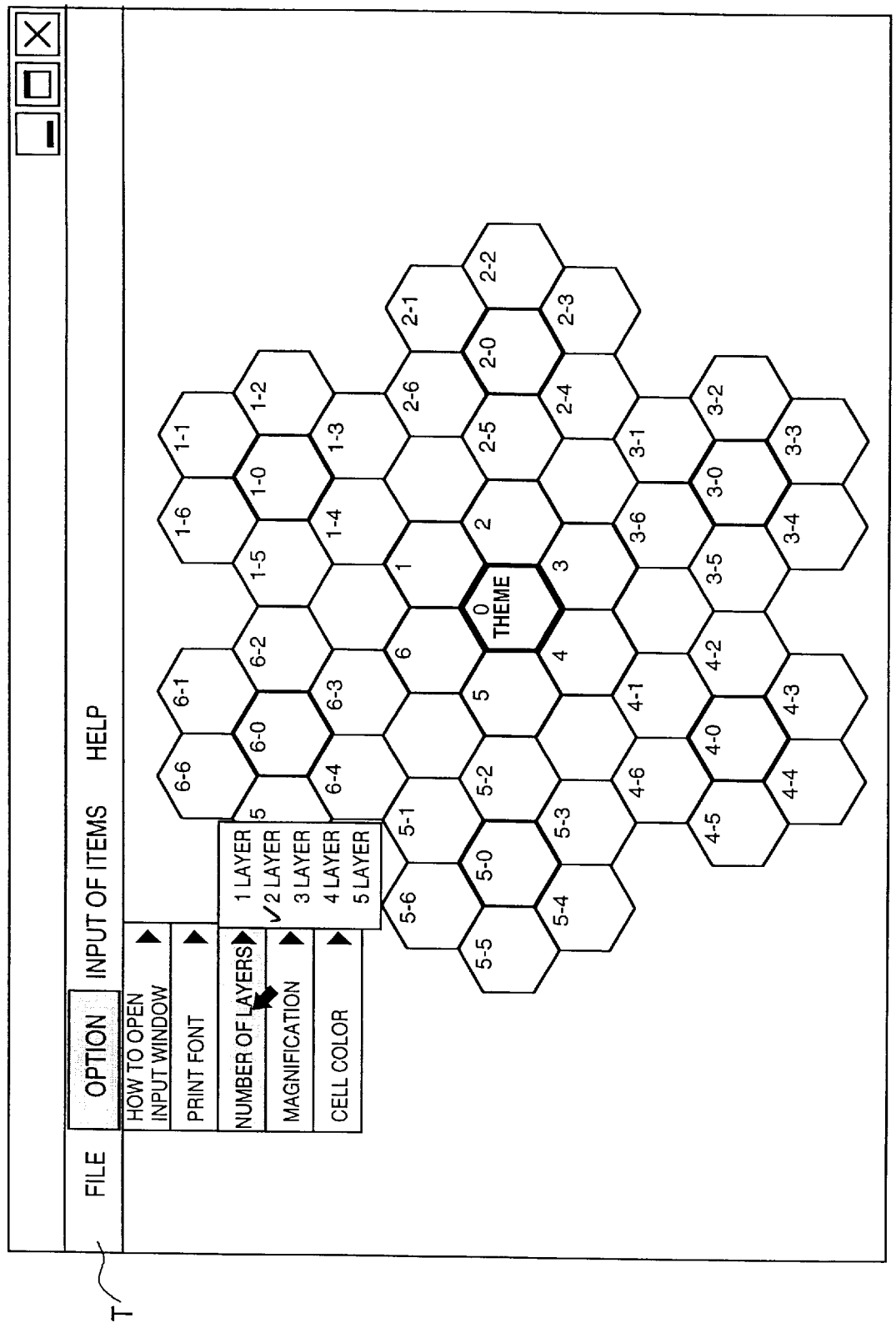

At menu item "number of layers", data inputtable cells can be set within the range from one to five layers, as shown in FIG. 18. In FIG. 18, since data inputtable cells are set up to the second layer, cells up to second-layer element input cells 1-1 to 1-6, 2-1 to 2-6, . . . , 6-1 to 6-6 are displayed.

Figure 19:
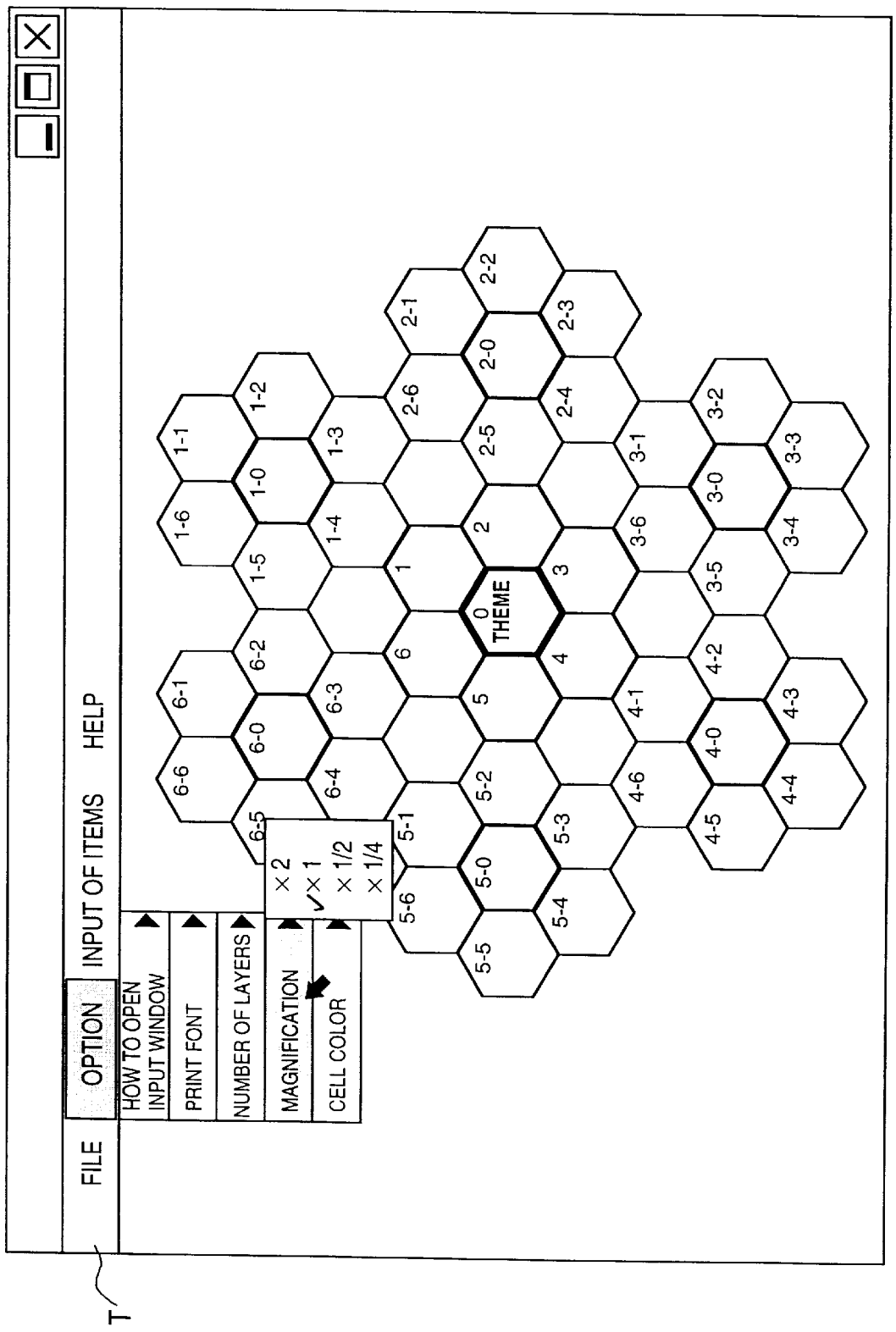

At menu item "magnification", as shown in FIG. 19, the cell display magnification can be changed to one of 2×, 1×, ½×, and ¼×. For example, when "number of layers" is set at three or more layers, "magnification" is set at ½× or ¼×, so that cells up to the third layers can be displayed on the screen. In FIG. 19, the display magnification is set at 1×, and cells up to second-layer element input cells 1-1 to 1-6, 2-1 to 2-6, . . . , 6-1 to 6-6 are displayed.

Figure 20:
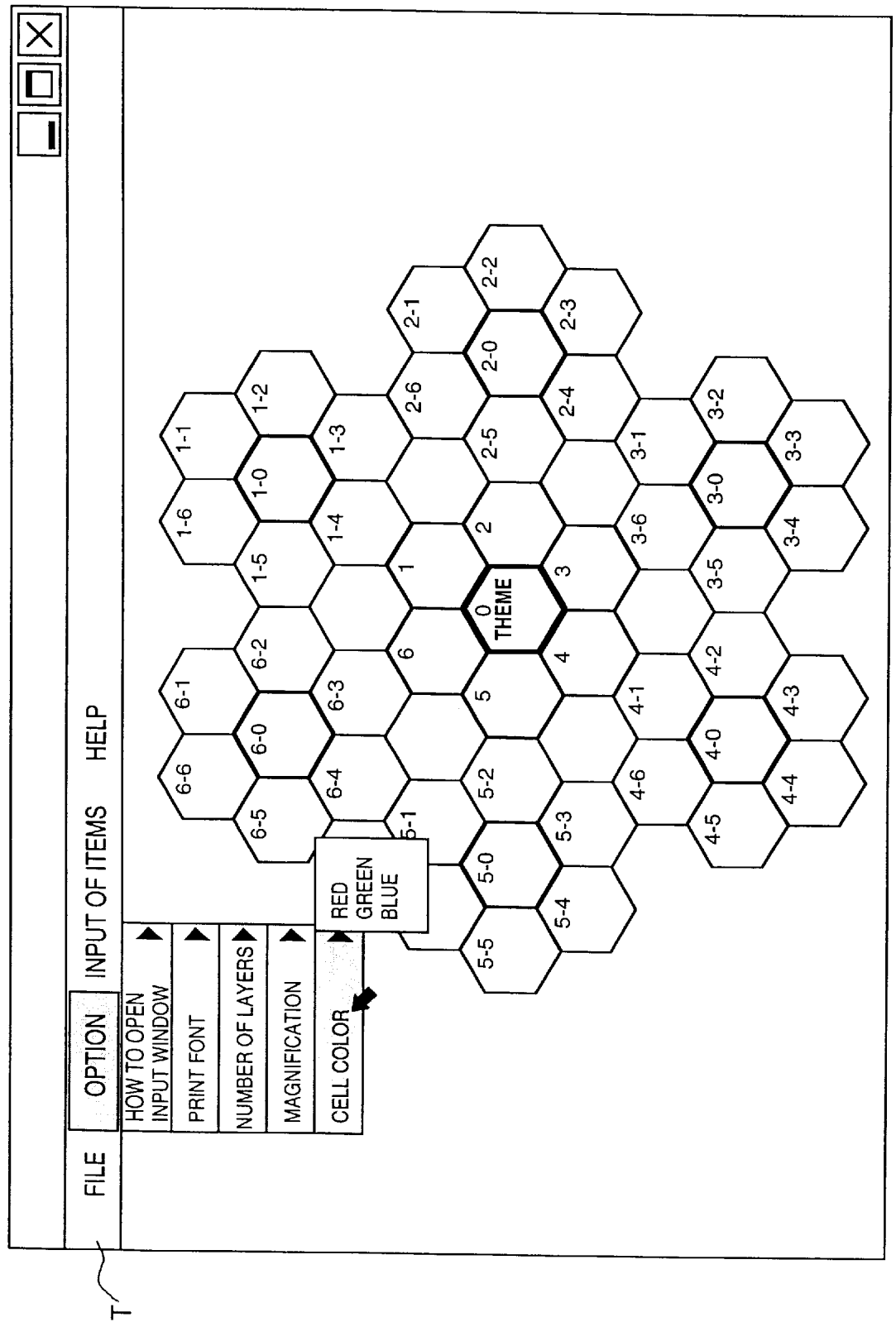

At menu item "cell color", as shown in FIG. 20, the input cell color can be changed to one of red, green, and blue. For example, when the color of the theme input cell is set to be red, the color of first-layer element input cells 1 to 6 and subtheme input cells 1-0, 2-0, 3-0, . . . , 6-0 is set to be green, and the color of second-layer element input cells 1-1 to 1-6, 2-1 to 2-6, . . . , 6-1 to 6-6 is set to be blue, the types (e.g., the first and second layers) of cells displayed on the screen can be easily identified.

(Input Operation of Items)

Figure 21:
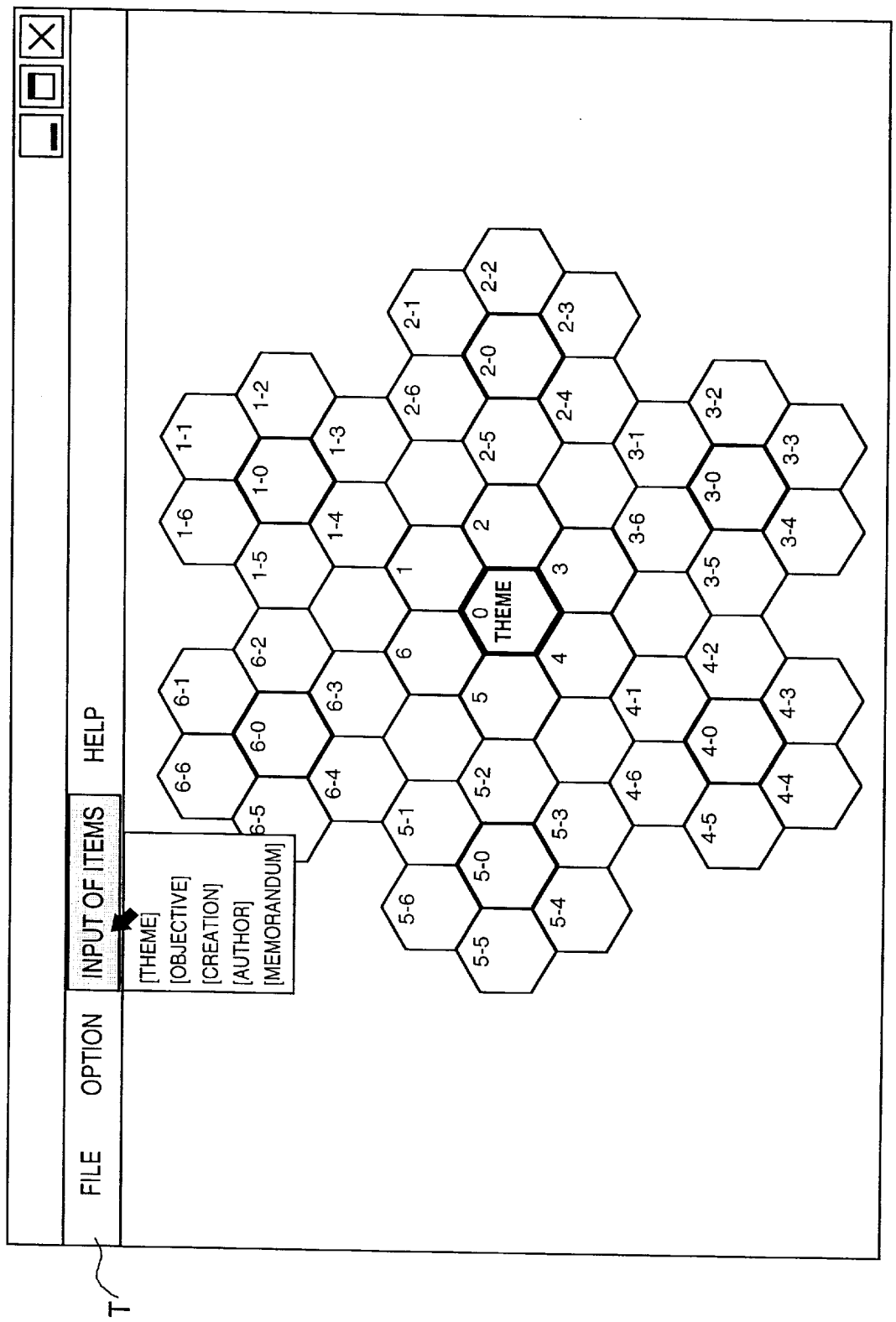

When "input of items" on the operation selection display portion T is clicked by the mouse, operation menu items "theme", "objective", "creation", "author", and "memorandum" are displayed, as shown in FIG. 21. When a corresponding item is clicked by the mouse, the data input window opens, and data can be input from the keyboard. These items are respectively printed as a theme block a, objective block b, date block c, author block d, and memorandum e, as shown in FIG. 3, by a printer or the like.

When "help" on the operation selection display portion T is clicked by the mouse, help documents such as a data input method upon executing this program and the like are displayed.

At the main operation, input data is changed, added, or deleted by opening the data input window.

<Execution Procedure of Hexagonal Element Extraction Method of Third Embodiment>

Figure 22:
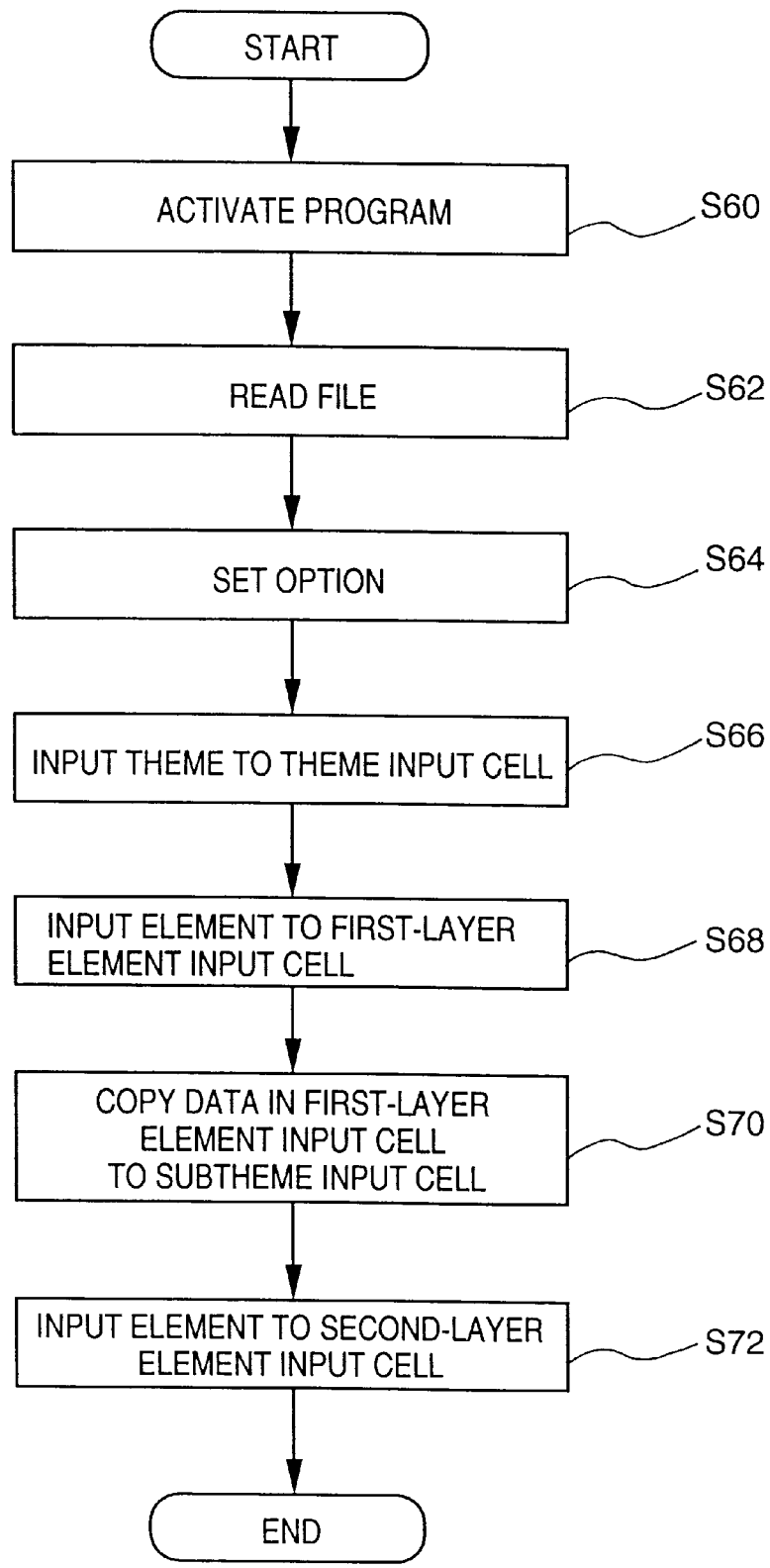
FIGS. 22 and 23 are flow charts showing the execution procedure of an information organization method according to the third embodiment of the present invention.
Figure 23:
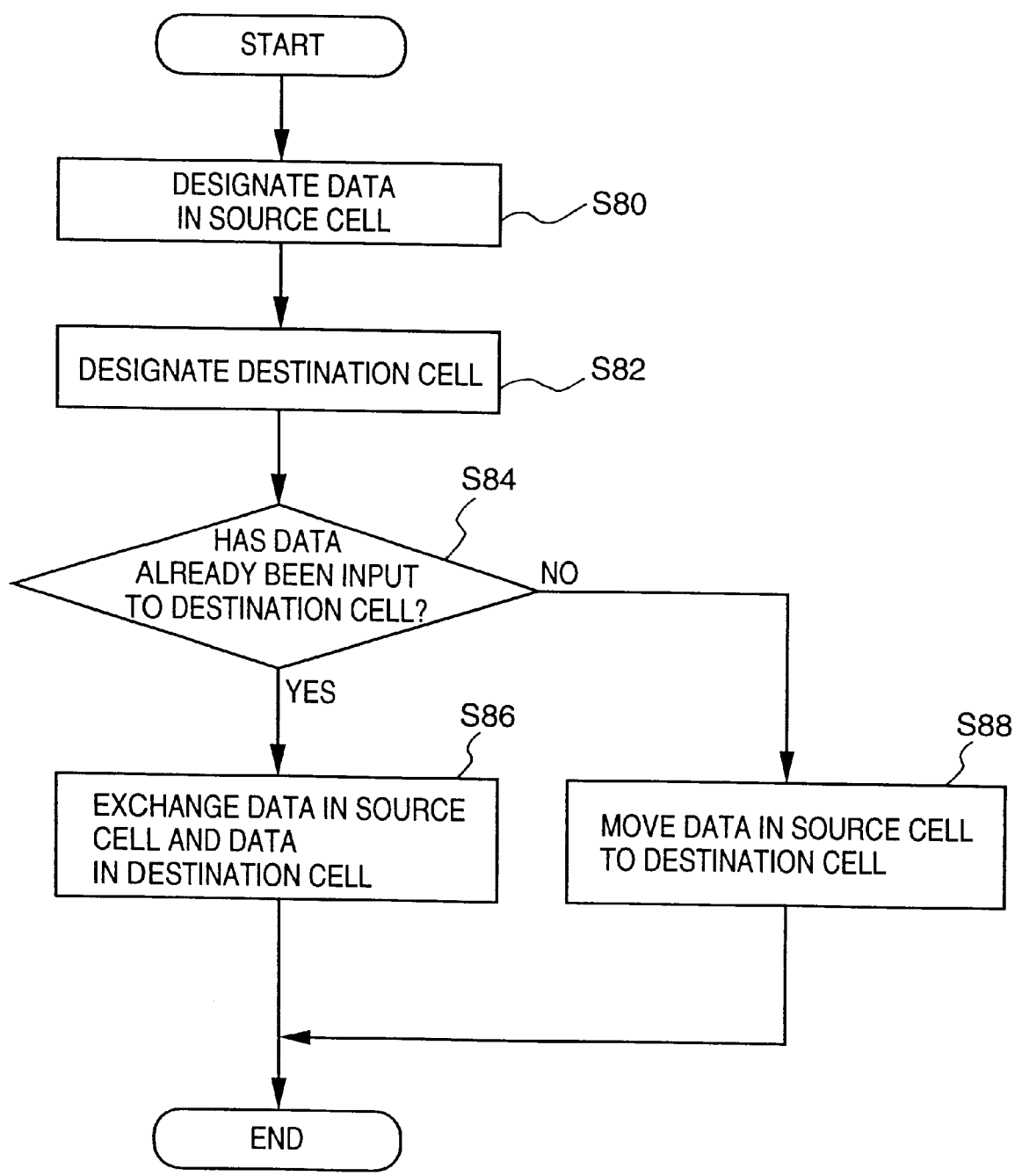

The execution procedure of the hexagonal element extraction method of the third embodiment will be described below. FIGS. 22 and 23 are flow charts showing the execution procedure of the hexagonal element extraction method according to the third embodiment of the present invention. FIGS. 24 to 32 show display screen images of the execution results of the hexagonal element extraction method of the third embodiment.

As shown in FIG. 22, when the program of the hexagonal element extraction method is activated in step S60, a new element system diagram is displayed, as shown in FIG. 16. When the existing file is to be edited, the existing file is read by the "file" operation in step S62. While the existing file or the new element system diagram is displayed, "number of layers", "magnification", "cell color", and the like are set by the "option" operation in step S64.

Figure 24:
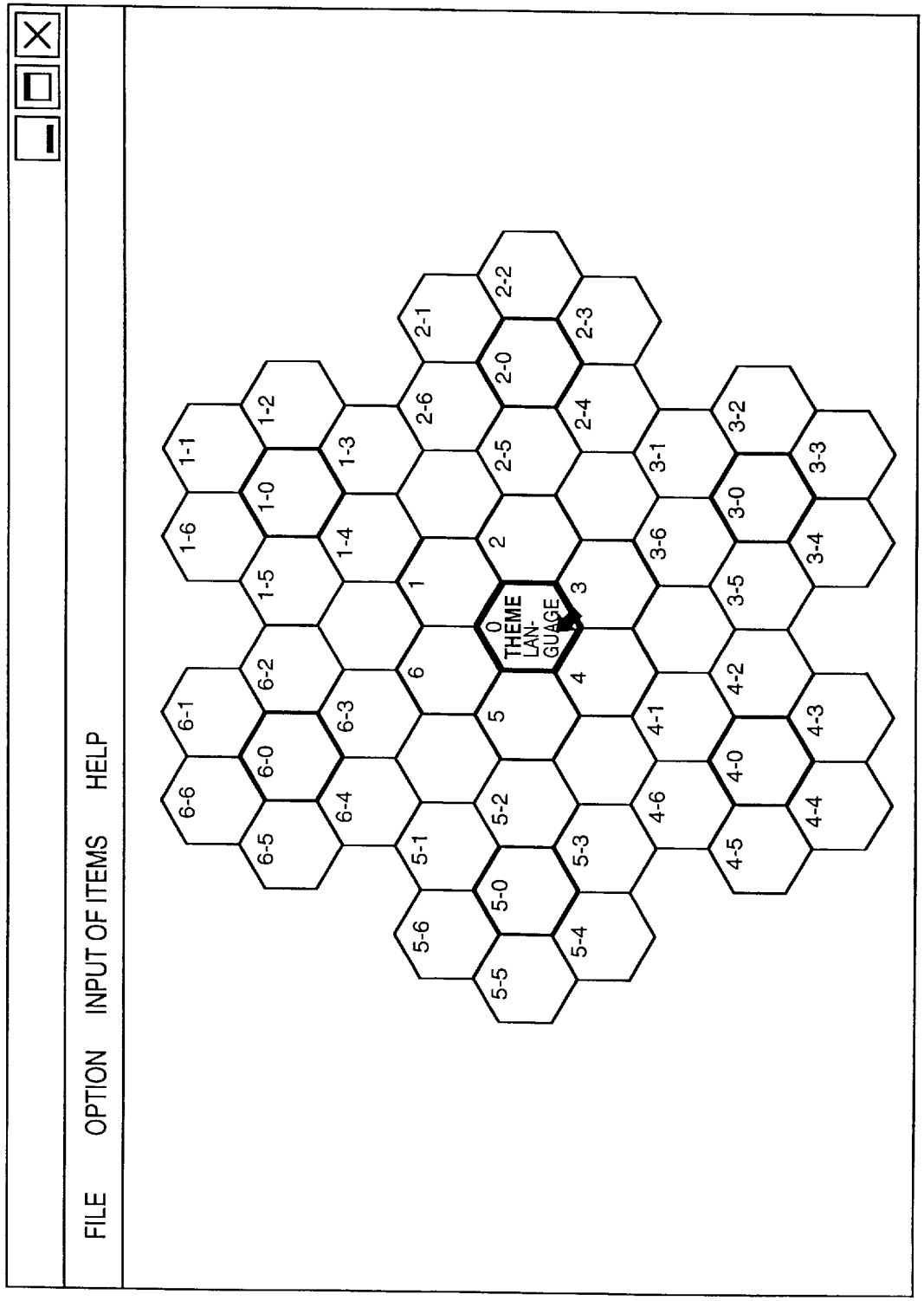
FIGS. 24 to 32 show display screen images of the execution results of the information organization method of the third embodiment.
Figure 25:
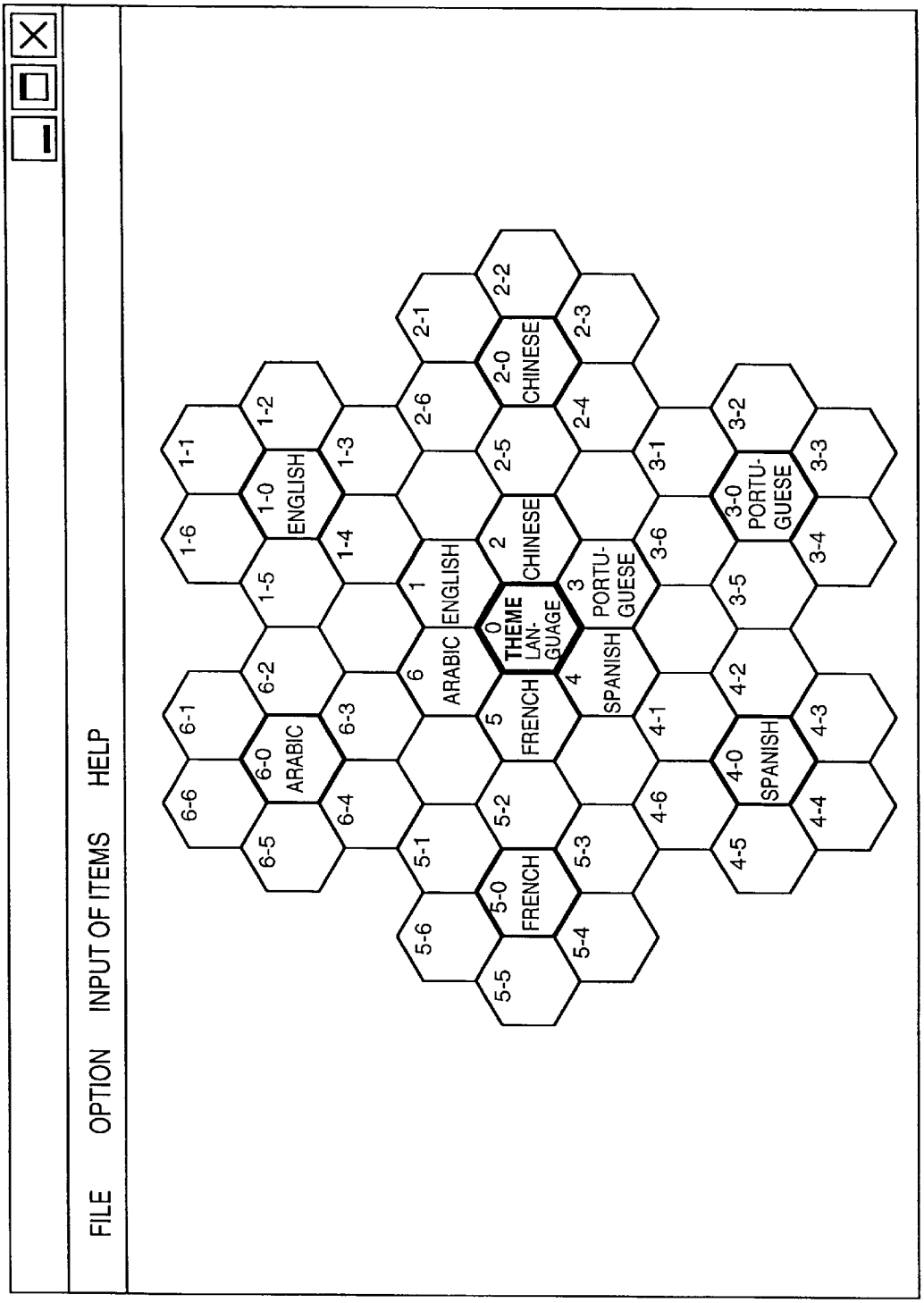

Thereafter, in step S66, a theme is input to the theme input cell. As shown in FIG. 24, in this embodiment, "language" is input as theme data into the theme input cell. In step S68, element data that come into one's mind from the theme data are input to first-layer element input cells 1 to 6. As shown in FIG. 25, in this embodiment, element data "English", "Chinese", "Portuguese", "Spanish", "French", and "Arabic" are input to first-layer element input cells 1 to 6 on the basis of theme "language". In step S70, the element data in first-layer element input cells 1 to 6 are automatically copied to subtheme input cells 1-0, 2-0, 3-0, . . . , 6-0. As shown in FIG. 25, the element data "English", "Chinese", "Portuguese", "Spanish", "French", and "Arabic" in first-layer element input cells 1 to 6 are automatically copied into subtheme input cells 1-0, 2-0, 3-0, . . . , 6-0. In steps S60 to S70, element data of the first layer are input.

Figure 26:
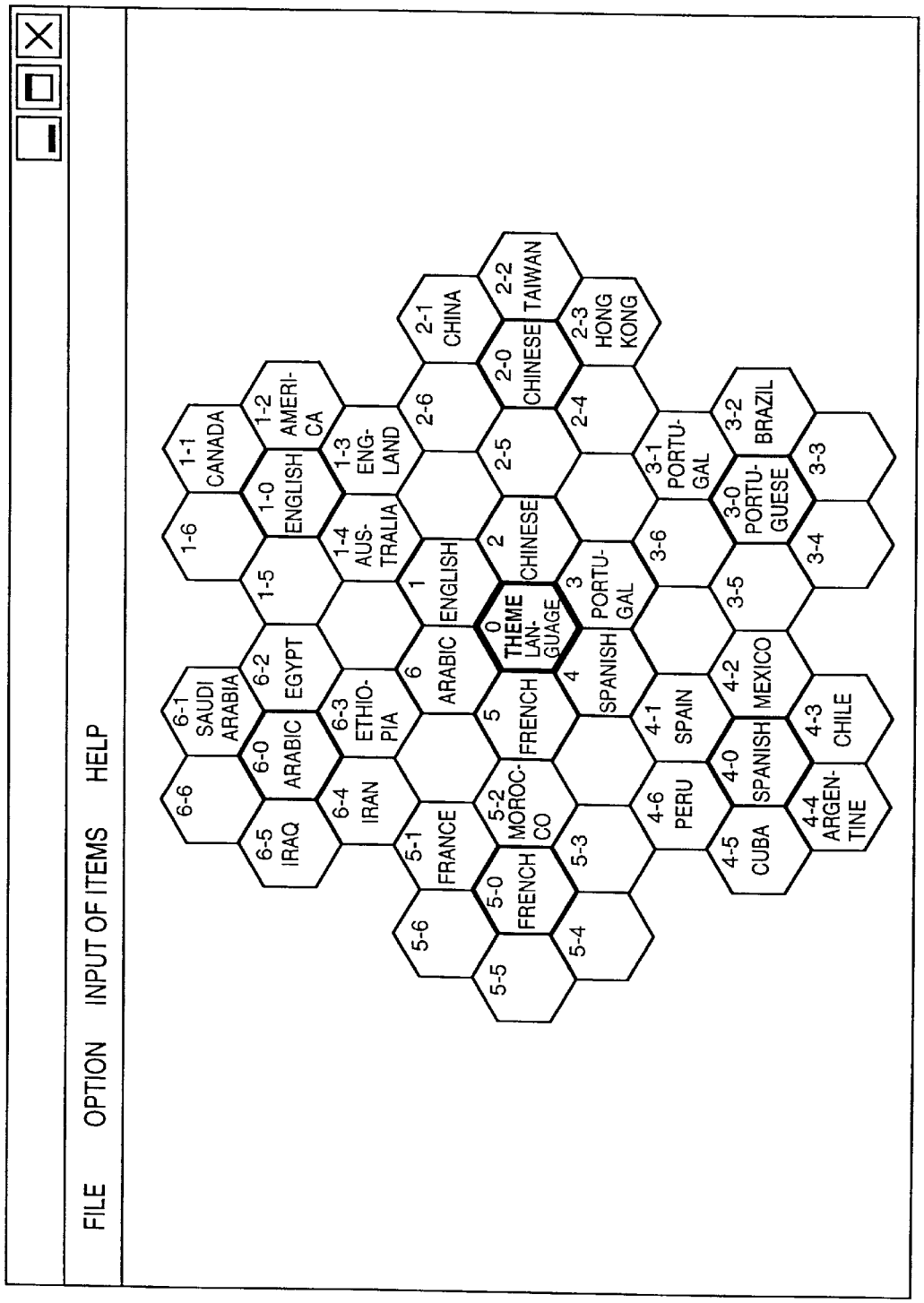
Figure 27:
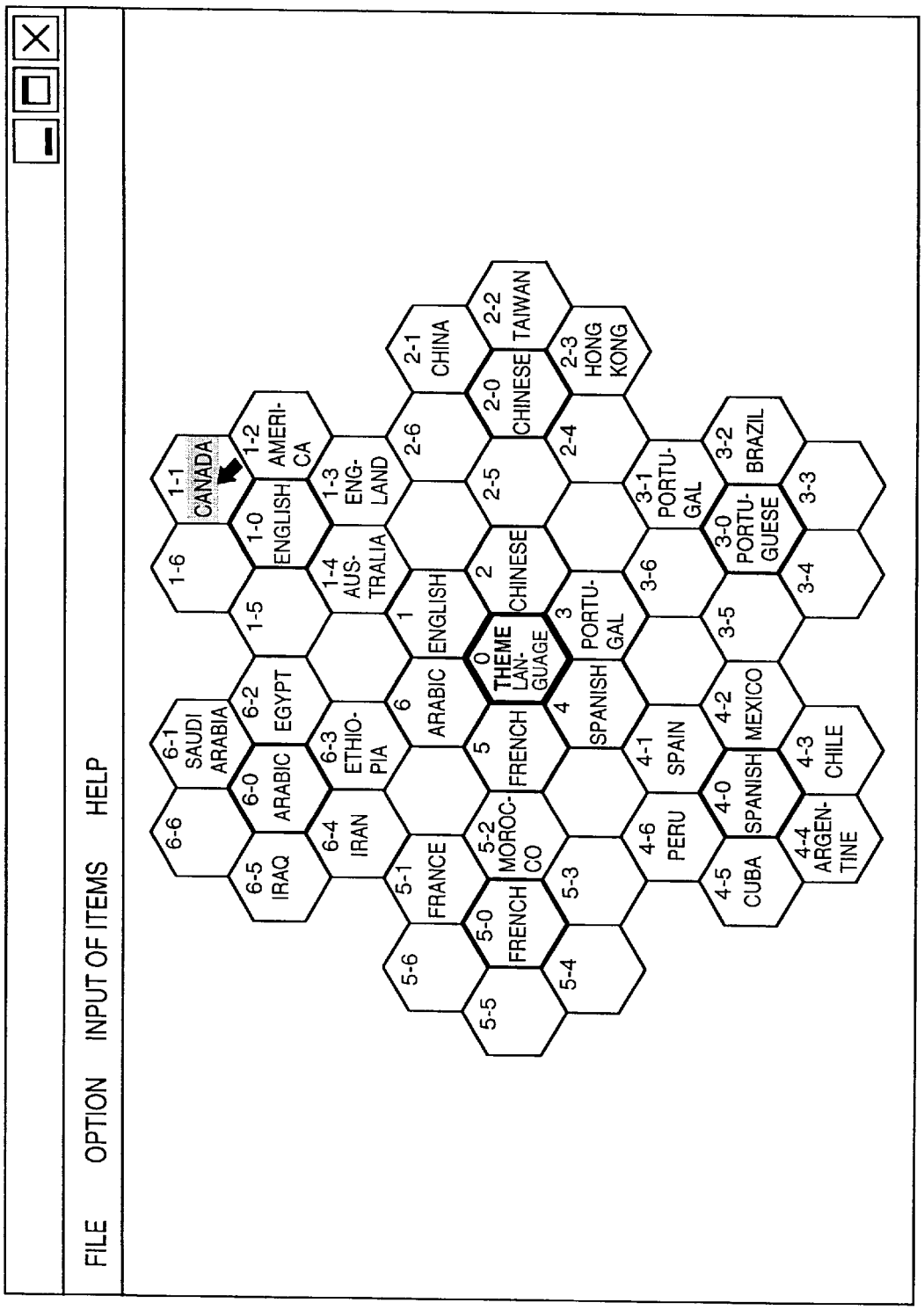

In step S72, new element data that come into one's mind using the element data input to first-layer element input cells 1 to 6 as new subthemes are input to second-layer element input cells 1-1 to 1-6, 2-1 to 2-6, . . . , 6-1 to 6-6. As shown in FIG. 26, in this embodiment, element data "Canada", "America", "England", and "Australia" are input to second-layer element input cells 1-1 to 1-4 on the basis of subtheme "English" in subtheme input cell 1-0; element data "China", "Taiwan", and "Hong Kong" are input to second-layer element input cells 2-1 to 2-3 on the basis of subtheme "Chinese" in subtheme input cell 2-0; element data "Portugal" and "Brazil" are input to second-layer element input cells 3-1 and 3-2 on the basis of subtheme "Portuguese" in subtheme input cell 3-0; element data "Spain", "Mexico", "Chile", "Argentine", "Cuba", and "Peru" are input to second-layer element input cells 4-1 to 4-6 on the basis of subtheme "Spanish" in subtheme input cell 4-0; element data "France" and "Morocco" are input to second-layer element input cells 5-1 and 5-2 on the basis of subtheme "French" in subtheme input cell 5-0; and element data "Saudi Arabia", "Egypt", "Ethiopia", "Iran", and "Iraq" are input to second-layer element input cells 6-1 to 6-5 on the basis of subtheme "Arabic" in subtheme input cell 6-0.

Note that a CD-ROM drive, facsimile apparatus, telephone, scanner device, video cassette recorder, loudspeaker/microphone, and speech recognition processing circuit, and the like may be added to the computer system shown in FIGS. 14 and 15 to build a multimedia system, so that element data to be input to each cell may be input as image data or audio data, and may be displayed as image data or audio data or may be stored in a storage medium.

<Data Move/replace Processing>

Processing for moving data in the cell input in the above-mentioned procedure to another cell or replacing data between two cells will be described below.

FIG. 23 is a flow chart showing the processing procedure for moving/replacing data in the cell.

Figure 28:
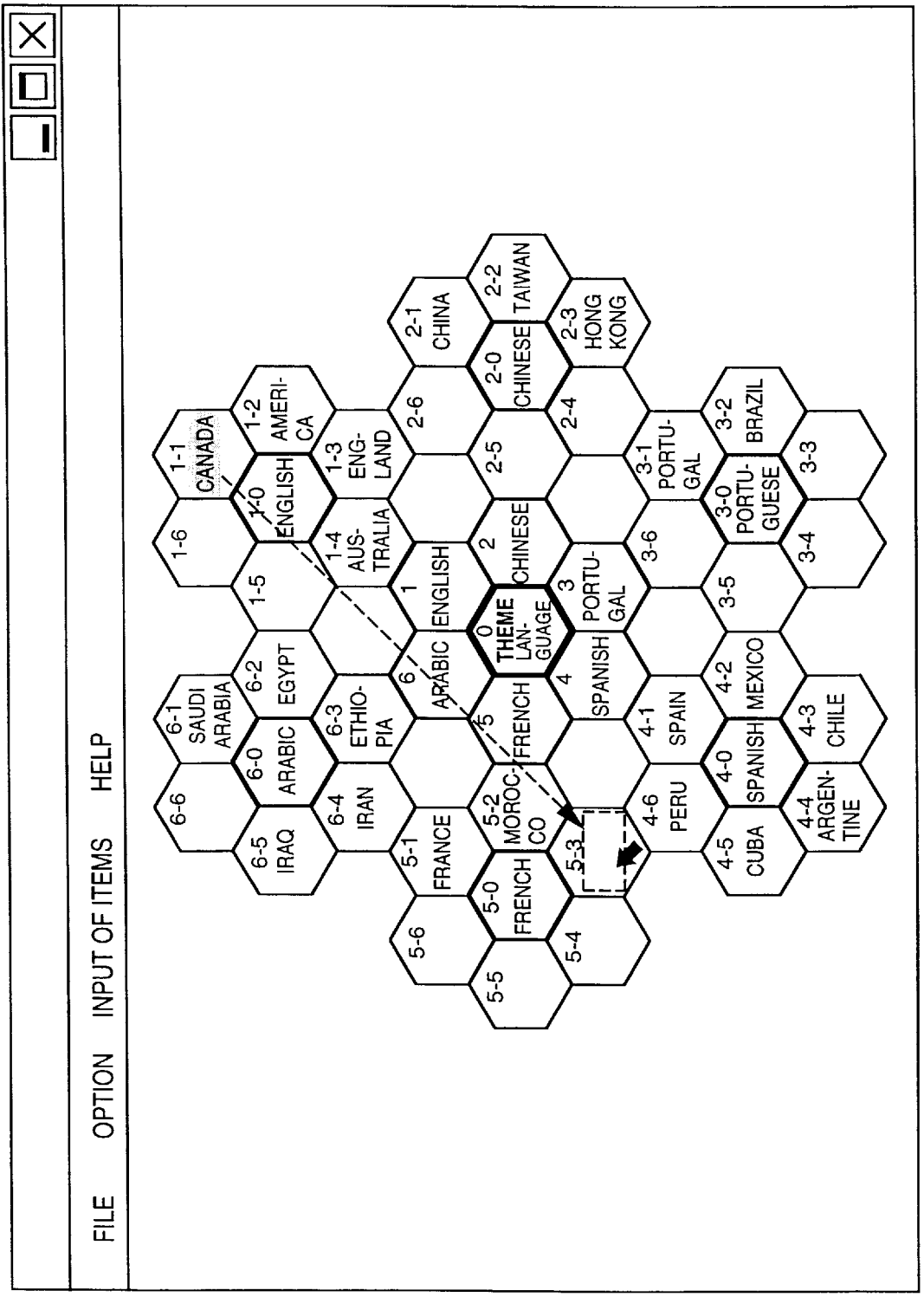

As shown in FIG. 23, element data in a source cell is designated in step S80. In this embodiment, element data "Canada" input to second-layer element input cell 1-1 is designated. In step S82, a destination cell of the element data designated in step S80 is designated. As shown in FIG. 28, second-layer element input cell 5-3 to which no data is input is designated as the destination cell of element data "Canada" in second-layer element input cell 1-1.

Figure 29:
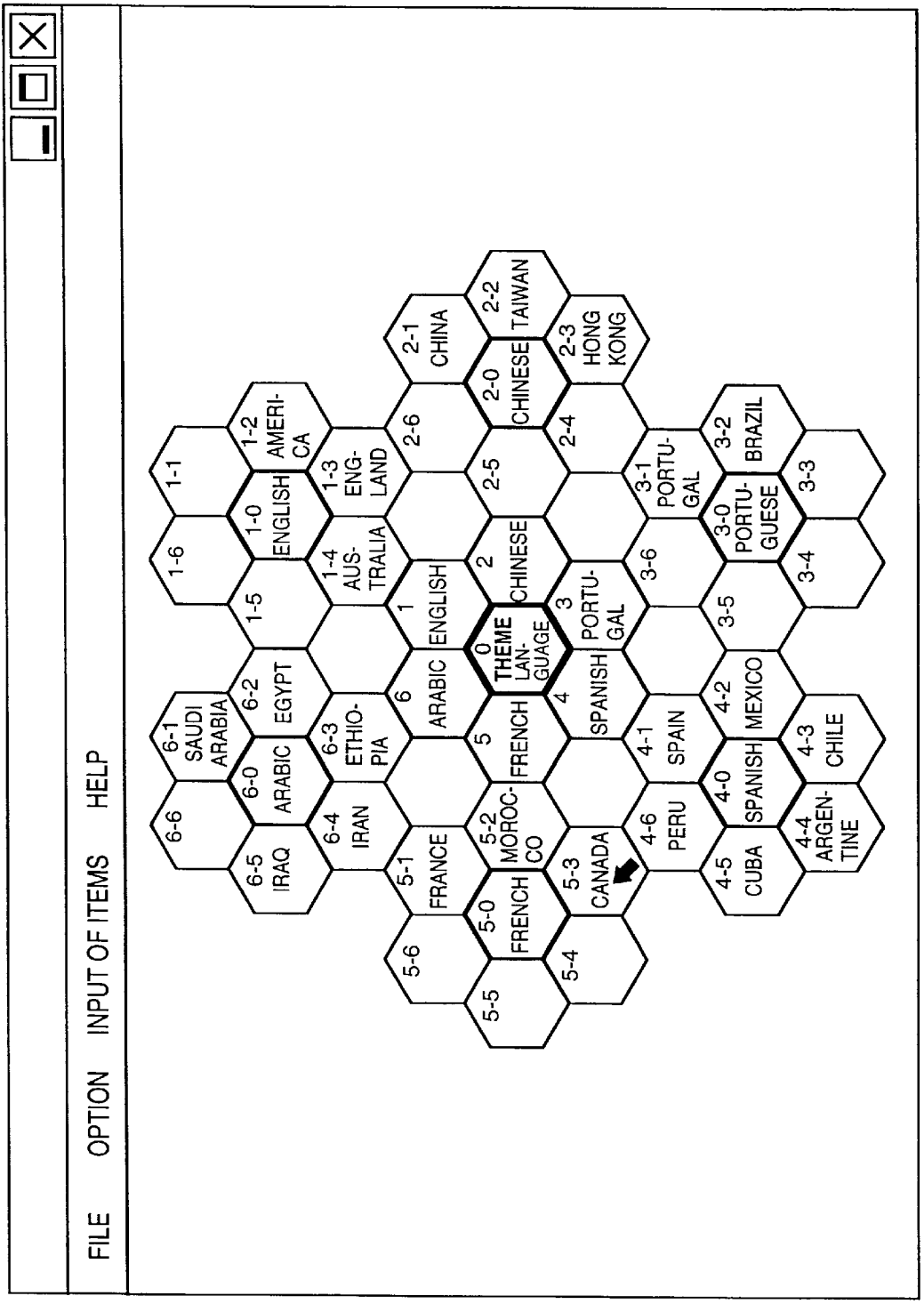

In step S84, it is checked if element data has already been input to the destination cell. If the element data is not input to the destination cell yet (NO in step S84), the flow advances to step S88, and the element data in the source cell is moved to the destination cell. As shown in FIG. 29, in this embodiment, element data "Canada" in second-layer element input cell 1-1 is moved to second-layer element input cell 5-3.

Figure 30:
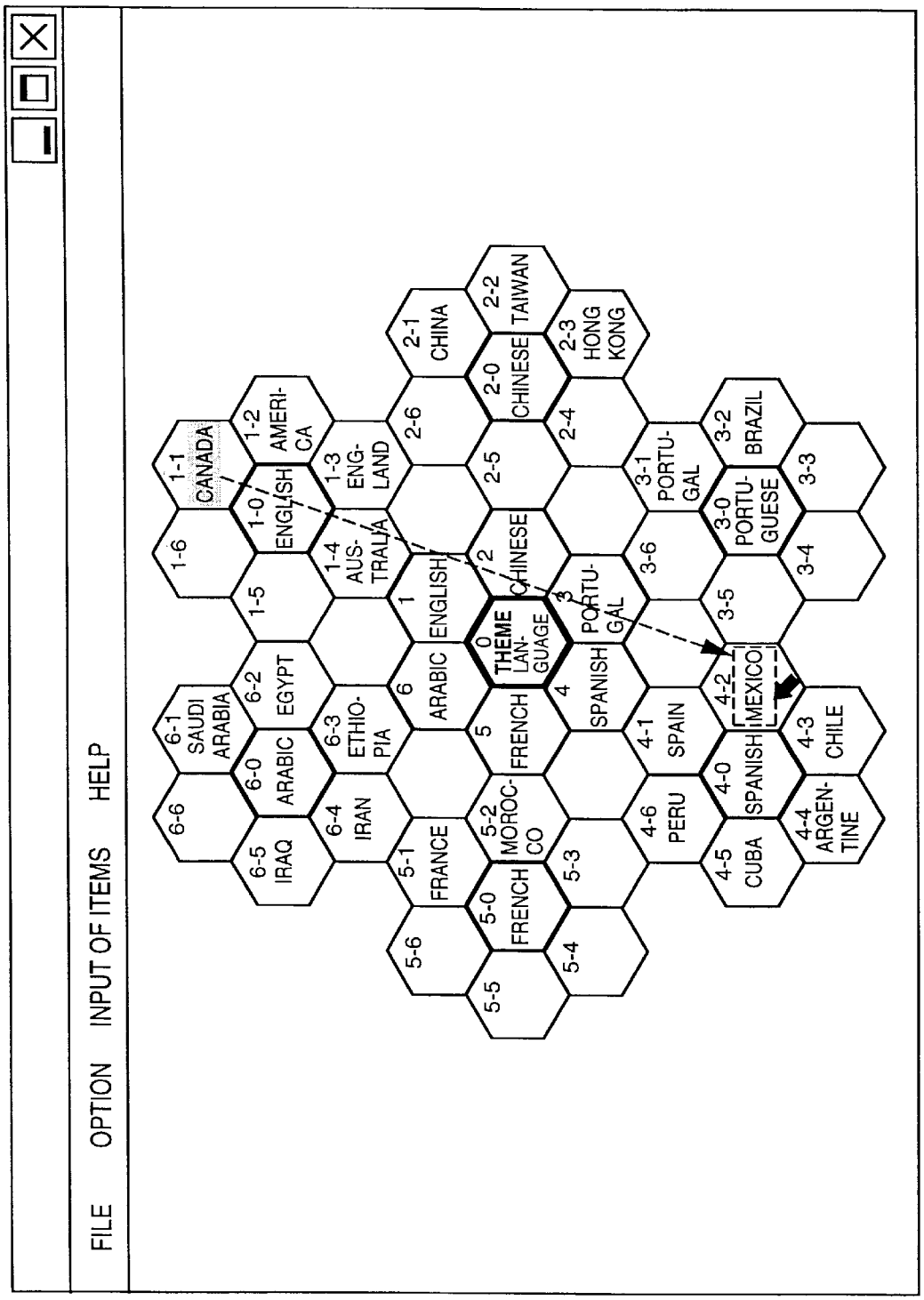
Figure 31:
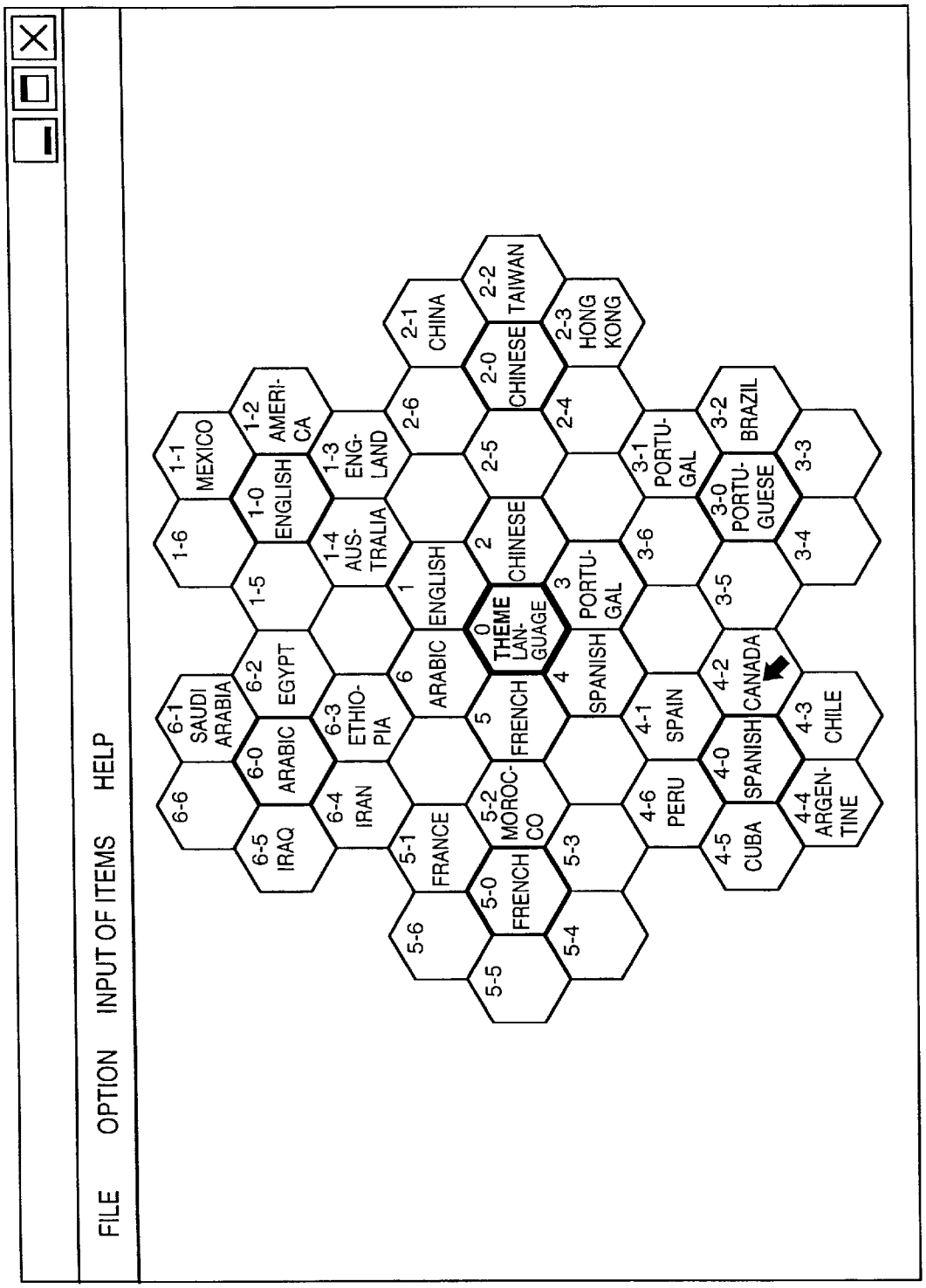

On the other hand, if it is determined in step S84 that element data has already been input to the destination cell (YES in step S84), the flow advances to step S86. In step S86, the element data in the source cell is moved to the destination cell, and the element data in the destination cell is moved to the source cell. When second-layer element input cell 4-2 is designated as the destination cell of element data "Canada" in second-layer element input cell 1-1, as shown in FIG. 30, element data "Canada" in second-layer element input cell 1-1 is moved to second-layer element input cell 4-2, and element data "Mexico" in second-layer element input cell 4-2 is replaced to second-layer element input cell 1-1.

Figure 32:
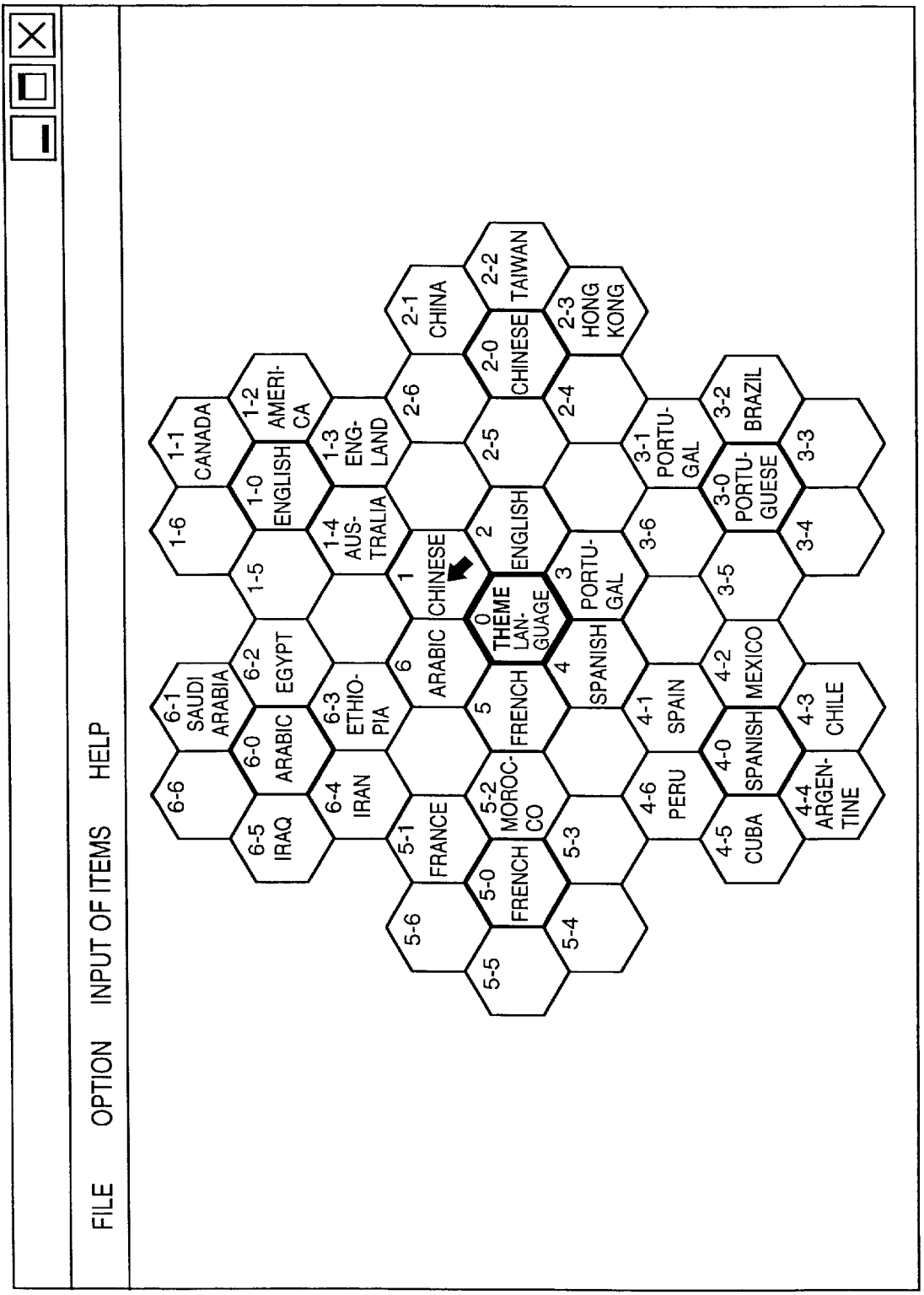

When element data in one of first-layer element input cells 1 to 6 is moved in the above-mentioned data move/replace processing, element data in first-layer element input cells 1 to 6 are automatically copied to subtheme input cells 1-0, 2-0, 3-0, . . . , 6-0 in accordance with the updated element data. For example, if element data "English" in first-layer element input cell 1 and element data "Chinese" in first-layer element input cell 2 are exchanged with each other, as shown in FIG. 32, element data "Chinese" is automatically copied to subtheme input cell 1-0 in accordance with element data "Chinese" moved to first-layer element input cell 1, and element data "English" is automatically copied to subtheme input cell 2-0 in accordance with element data "English" moved to first-layer element input cell 2.

The character size of element data input to each cell is automatically set in correspondence with the number of characters.

In the hexagonal element extraction method of the first to third embodiments, the region to which an element is written or input has a hexagonal or triangular shape, and preferably has a regular hexagonal or triangular shape. However, a triangular region is not suitable for writing an element or inputting data since the region becomes narrower toward the corners. In contrast to this, since a hexagonal region is wider than the triangular region, and has a symmetrical shape, it is easy to write an element or to input data. Also, illustrations or the like may be input to the hexagonal region in place of characters.

As described above, according to the first to third embodiments, the theme is set as a hexagonal core, the elements, action means, and the like that come into one's mind in association with the set theme are broken down into six hexagons around the core to form the first layer, and the elements that occur in the first layer are defined as new cores and the elements, action means, and the like that come into one's mind in association with these new cores are further broken down into six each hexagons around the cores to form the second layer. In this manner, the number of layers is increased and the elements, action means, and the like that come into one's mind can be hierarchically broken down, thus easily converting abstract idea into concrete idea.

According to the third embodiment, when manually systemized events are input to the computer, movement, addition, and the like of data can be freely attained by utilizing powerful processing performance of the computer, and conception and systematization can be rapidly cultivated.

Also, according to the third embodiment, an information organization can be implemented by a computer and can process information and build a database by interfacing with the computer rapidly.

According to the first to third embodiments, the present invention can be used as a very effective "hint and tool" that can efficiently, even slightly solve problems that arise in daily life.

According to the first to third embodiments, even when the strategy for solving a certain problem is wrong, knowledge about the problem is insufficient or unbalanced, or one excessively sticks to his or her idea, ignores priority, or cannot foresee events that are likely to occur, or even when one forgets a solution when he or she takes action, cannot satisfactorily convey such idea to other people, has insufficient resources required for realization, or cannot find techniques even if he or she has a sound idea and effective solution, practically useful information and tool can be provided to support so that good thinking results in a good action and a good result in daily life.

According to the first to third embodiments, mutual understanding can be promoted more accurately and effectively than compositions by showing some concrete knowledge and idea required for finding a new fact or obtaining a creative idea via expression of one's knowledge and idea by a honeycomb-like hexagonal structure.

According to the first to third embodiments, not only existing explanatory notes and knowledge based on above mentioned expression are provided, but also a person can effectively systemize and organize their own respective idea.

Note that the present invention can also be applied to modifications of the embodiments within the scope of the invention.

For example, by the above-mentioned file operation, the sheet of style D shown in FIG. 5 may be displayed on the screen, and one of items "document", "design", "still image", "moving image", and "sound" in the type block h may be clicked to input or reproduce document data, image data, audio data, or the like. Also, data input on the screen may be printed out in the form of the sheet of style D, if required.

The object of the present invention achieved by the functions of the computer system of the third embodiment can also be achieved by a storage medium that stores the program of the hexagonal element extraction method of the third embodiment. More specifically, that storage medium is loaded into the computer system of the third embodiment, and the program itself read out from the storage medium achieves novel functions of the present invention. As the structural features of the program according to the present invention, as shown in FIG. 33, a storage medium M such as the floppy disk 26, CD-ROM, or the like shown in FIG. 15 stores a code m1 of the step of displaying a theme input cell, first-layer element input cells, second-layer element input cells, and the like, a code m2 of the step of inputting data into the displayed cells, a code m3 of the step of automatically copying data input into the first-layer element input cells to subtheme input cells, a code m4 of the step of moving data in a cell designated as a source cell to another cell designated as a destination cell, and a code m5 of the step of exchanging data in a cell designated as a source cell and data in a cell designated as a destination cell with each other. The step codes m1 to m5 shown in FIG. 33 may be stored in the storage medium M after the data volume is reduced by compression processing.

As many apparently widely different embodiments of the present invention can be made without departing from the spirit and scope thereof, it is to be understood that the invention is not limited to the specific embodiments thereof except as defined in the appended claims.

We claim:

1. An information organization method by using at least a hexagonal module comprising a hexagonal first region and six hexagonal second regions which are set around said first region, for systematically organizing information by extracting related elements from a predetermined subject while sequentially entering the related elements into said second regions, comprising the steps of:

entering the predetermined subject in the hexagonal first region;

entering first-layer related elements which are extracted from the predetermined subject into the hexagonal second regions;

entering the first-layer related elements into a hexagonal third region which comprises another hexagonal module; and entering second-layer related elements which are extracted from the first-layer related elements into hexagonal fourth regions, which are set around said third region and comprise said another hexagonal module, thereby organizing the related elements which are extracted from the predetermined subject while breaking down the related elements into a plurality of layers.

2. The method according to claim 1, wherein six second regions equivalent to said second regions are arranged to contact said first region, and six fourth regions equivalent to said fourth regions are arranged to contact with said third region.

3. The method according to claim 1, wherein said second and fourth regions are set to be separated from each other.

4. The method according to claim 1, wherein the predetermined subject is broken down into at least fifth-layer related elements.

5. An information organization sheet for systematically organizing information by extracting related elements from a predetermined subject while sequentially writing the related elements into predetermined regions, comprising:

a hexagonal first region for writing the predetermined subject;

six hexagonal second regions which are set around said first region and are used for writing first-layer related elements which are extracted from the predetermined subject;

a hexagonal third region for writing the first-layer related elements; and six hexagonal fourth regions which are set around said third region and are used for writing second-layer related elements which are extracted from each of the first-layer related elements, wherein said first and second regions comprise a hexagonal module, and wherein said third and fourth regions comprise another hexagonal module, at least one module being provided to the information organization sheet;

wherein said second regions and subsequent regions are arranged to break down the first region into a plurality of layers.

6. The sheet according to claim 5, wherein six second regions equivalent to said second regions are arranged to contact said first region, and six fourth regions equivalent to said fourth regions are arranged to contact said third region.

7. The sheet according to claim 6, wherein said second and fourth regions contact each other.

8. The sheet according to claim 7, wherein hexagonal blank regions are formed on portions surrounded by said second and fourth regions.

9. The sheet according to claim 6, wherein said second and fourth regions are set to be separated from each other.

10. The sheet according to claim 5, wherein adhesive sheets on each of which the predetermined subject or the related elements are written in advance and are overlayed to said first through fourth regions.

11. The sheet according to claim 10, wherein said adhesive sheets are colored to help visually recognize the predetermined region.

12. The sheet according to claim 5, wherein the predetermined regions are arranged to be able to be broken down into at least fifth-layer related elements.

13. A display apparatus for systematically organizing information by extracting related element data from a predetermined subject data while sequentially inputting the related element data in predetermined cells, comprising:

display means for hierarchically breaking down and displaying at least a hexagonal module, said hexagonal module comprising a hexagonal first cell in which the predetermined subject data can be input and six hexagonal second cells which are set around said first cell and in which first-layer related element data which is extracted from the predetermined subject data can be input, and another hexagonal module comprising a hexagonal third cell in which the first-layer related element data can be input and six hexagonal fourth cells which are set around said third cell and in which second-layer related element data which is extracted from the first-layer related data can be input; and input means for inputting the predetermined subject data or the related element data which is extracted from the predetermined subject data to said first through fourth cells.

14. The apparatus according to claim 13, wherein six second cells equivalent to said second cells are arranged in correspondence with said first cell, and six fourth cells equivalent to said fourth cells are arranged in correspondence with said third cell.

15. The apparatus according to claim 13, wherein the predetermined cells are displayed to be able to be broken down into at least fifth-layer related element data.

16. The apparatus according to claim 13, further comprising transfer means for automatically transferring the first-layer related element data input to said second cell and to said third cell.

17. The apparatus according to claim 13, further comprising moving means for moving related element data input to a predetermined cell and to another cell.

18. The apparatus according to claim 17, further comprising exchange means for exchanging related element data between predetermined cells.

19. The apparatus according to claim 15, further comprising layer setting means for setting the number of layers of the predetermined cells.

20. The apparatus according to claim 15, further comprising color changing means for changing a display color of the predetermined cells.

21. The apparatus according to claim 13, further comprising magnification setting means for setting a display magnification of cells by said display means.

22. A computer readable memory which stores a program code for systematically organizing information by extracting related element data from a predetermined subject data while sequentially inputting the related element data in predetermined cells, comprising:
   a code of a display step of hierarchically breaking down and displaying at least a hexagonal module, said module comprising a hexagonal first cell in which the predetermined subject data can be input and six hexagonal second cells which are set around said first cell and in which first-layer related element data which is extracted from the predetermined subject data can be input, and another hexagonal module comprising a hexagonal third cell in which the first-layer related element data can be input and six hexagonal fourth cells which are set around said third cell and in which second-layer related element data which is extracted from the first-layer related element data can be input as another module; and
   a code of an input step of inputting the predetermined subject data or the related element data which is extracted from the predetermined subject data to said first through fourth cells.

23. The memory according to claim 22, further comprising a code of a transfer step of automatically transferring the first-layer related element data input to the second cell and to said third cell.

24. The memory according to claim 22, further comprising a code of a moving step of moving related element data input to a predetermined cell and to another cell.

25. The memory according to claim 22, further comprising a code of an exchange step of exchanging related element data between predetermined cells.

26. A display control method for a display apparatus for systematically organizing information by extracting related element data from a predetermined subject data while sequentially inputting the related element data in predetermined cells, comprising:
   a cell display step of hierarchically breaking down and displaying at least a hexagonal module, said hexagonal module comprising a hexagonal first cell in which the predetermined subject data can be input and six hexagonal second cells which are set around said first cell and in which first-layer related element data which is extracted from the predetermined subject data can be input, and another hexagonal module comprising a hexagonal third cell in which the first-layer related element data can be input and six hexagonal fourth cells which are set around said third cell and in which second-layer related element data which is extracted from the first-layer related element data can be input;
   a first step of inputting predetermined subject data in said first cell and displaying the predetermined subject data on said first cell;
   a second step of inputting first-layer related element data into said second cells and displaying the first-layer related element data on said second cells;
   a third step of displaying the first-layer related element data on said third cell; and
   a fourth step of inputting second-layer related element data in said fourth cells, and displaying the second-layer related element data on said fourth cells.

27. The method according to claim 26, wherein six second cells equivalent to said second cells are arranged in correspondence with said first cell, and six fourth cells equivalent to said fourth cells are arranged in correspondence with said third cell.

28. The apparatus according to claim 26, wherein the predetermined cells can be displayed while being broken down into at least fifth-layer related element data.

29. A method of using an information organization sheet which has at least a hexagonal module comprising a hexagonal first region and six hexagonal second regions which are set around said first region, and another hexagonal module comprising a hexagonal third region and six hexagonal fourth regions which are set around said third region, and on which said second regions and subsequent regions are arranged to break down the first region into a plurality of layers, comprising the steps of:
   writing a predetermined subject in said first region;
   writing first-layer related elements which are extracted from the predetermined subject in each of said second regions;
   writing the first-layer related elements in said third region; and
   writing second-layer related elements which are extracted from the first-layer related elements in each of said fourth region.

30. The method according to claim 29, wherein adhesive sheets on each of which the predetermined subject or related elements are written in advance are adhered to said first through fourth regions.

31. The method according to claim 30, wherein said adhesive sheets are colored to help visually recognize said first through fourth regions.

* * * * *